US011871418B2

(12) United States Patent
Wang et al.

(10) Patent No.: US 11,871,418 B2
(45) Date of Patent: Jan. 9, 2024

(54) SCHEDULING CONFLICT RESOLUTION FOR OVERLAPPING SIDELINK TRANSMISSIONS

(71) Applicant: QUALCOMM Incorporated, San Diego, CA (US)

(72) Inventors: Xiaojie Wang, Hillsborough, NJ (US); Piyush Gupta, Bridgewater, NJ (US); Junyi Li, Franklin Park, NJ (US); Jing Sun, San Diego, CA (US); Xiaoxia Zhang, San Diego, CA (US); Peter Gaal, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 17/149,618

(22) Filed: Jan. 14, 2021

(65) Prior Publication Data

US 2022/0225376 A1    Jul. 14, 2022

(51) Int. Cl.
*H04W 72/21*    (2023.01)
*H04W 28/06*    (2009.01)
(Continued)

(52) U.S. Cl.
CPC ........... *H04W 72/21* (2023.01); *H04W 28/06* (2013.01); *H04W 72/044* (2013.01); *H04W 92/18* (2013.01)

(58) Field of Classification Search
CPC ............. H04W 72/1284; H04W 28/06; H04W 72/044; H04W 92/18
See application file for complete search history.

(56) References Cited

U.S. PATENT DOCUMENTS 11,265,764 B2 * 3/2022 Tang ................. H04W 72/0406
11,424,883 B2 * 8/2022 Park ..................... H04W 72/56
(Continued)

FOREIGN PATENT DOCUMENTS

WO    WO-2019028847 A1    2/2019
WO    WO-2021090248 A1    5/2021

OTHER PUBLICATIONS

Asustek: "Discussion on Simultaneous Configuration of Mode 1 and Mode 2 for a UE", 3GPP Draft, 3GPP TSG RAN WG1 #100, R1-2001018, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar.6, 2020, Feb. 14, 2020 (Feb. 14, 2020), XP051853141, 04 Pages, Retrieved from the Internet: URL: https://ftp.3gpp.org/tsg_ran/WG1_RL1/TSGR1_100_e/Docs/R1-2001018.zip R1-2001018 Discussion on Simultaneous Configuration of Mode 1 and Mode 2_1.0.doc [retrieved on Feb. 14, 2020] Section 2.
(Continued)

*Primary Examiner* — Parth Patel
(74) *Attorney, Agent, or Firm* — Holland & Hart LLP/QUALCOMM Incorporated

(57) ABSTRACT

Methods, systems, and devices for wireless communications are described. A first UE may receive, from a second UE such as a PLC, sidelink control information scheduling a first transmission to be transmitted by the first UE to the second UE on a first set of resources in a dedicated resource pool for sidelink control signaling. The first UE may receive an indication that a second transmission is scheduled to be transmitted by the first UE on a second set of resources which at least partially overlaps in time with the first set of resources. The first UE may transmit at least one of the first transmission or the second transmission in accordance with (Continued)

a conflict resolution rule based on the second set of resources at least partially overlapping with the first set of resources.

46 Claims, 14 Drawing Sheets

(51) Int. Cl.
*H04W 72/044* (2023.01)
*H04W 92/18* (2009.01)

(56) References Cited

U.S. PATENT DOCUMENTS

| | | | |
|---|---|---|---|
| 2018/0049220 A1* | 2/2018 | Patil | H04W 72/1247 |
| 2018/0097609 A1* | 4/2018 | Tiirola | H04W 72/0413 |
| 2018/0376525 A1 | 12/2018 | Feng | |
| 2019/0306835 A1* | 10/2019 | Hoang | H04W 72/0493 |
| 2019/0306923 A1* | 10/2019 | Xiong | H04L 5/0051 |
| 2019/0349052 A1* | 11/2019 | Yum | H04L 5/0048 |
| 2019/0349066 A1* | 11/2019 | Yang | H04L 5/005 |
| 2019/0387377 A1* | 12/2019 | Zhang | H04W 84/005 |
| 2020/0008266 A1* | 1/2020 | Pan | H04L 1/1642 |
| 2020/0037343 A1 | 1/2020 | He et al. | |
| 2020/0112400 A1 | 4/2020 | Lee et al. | |
| 2020/0178256 A1* | 6/2020 | Tang | H04W 72/0406 |
| 2020/0196343 A1* | 6/2020 | Marinier | H04L 1/1896 |
| 2020/0260386 A1* | 8/2020 | Ryu | H04W 76/14 |
| 2020/0280338 A1* | 9/2020 | Matsumura | H04B 1/713 |
| 2020/0287654 A1* | 9/2020 | Xi | H03M 13/13 |
| 2020/0313743 A1 | 10/2020 | Park | |
| 2020/0344722 A1* | 10/2020 | He | H04W 72/0446 |
| 2020/0403749 A1* | 12/2020 | Park | H04L 5/0048 |
| 2021/0045088 A1* | 2/2021 | Cai | H04W 72/0473 |
| 2021/0105104 A1* | 4/2021 | Cao | H04W 72/0413 |
| 2021/0127383 A1* | 4/2021 | Hui | H04L 1/1864 |
| 2021/0136744 A1* | 5/2021 | Lu | H04W 72/02 |
| 2021/0144736 A1* | 5/2021 | Li | H04W 72/14 |
| 2021/0144750 A1* | 5/2021 | Cao | H04W 72/0446 |
| 2021/0153167 A1* | 5/2021 | Sarkis | H04W 72/0406 |
| 2021/0219320 A1* | 7/2021 | Belleschi | H04W 72/1278 |
| 2021/0243796 A1 | 8/2021 | Panteleev et al. | |
| 2021/0266869 A1* | 8/2021 | Jeong | H04W 76/27 |
| 2021/0274432 A1* | 9/2021 | Yang | H04W 48/16 |
| 2021/0321380 A1 | 10/2021 | Zhao | |
| 2021/0352710 A1* | 11/2021 | Lu | H04W 28/26 |
| 2022/0039080 A1* | 2/2022 | Khoryaev | H04W 4/40 |
| 2022/0053495 A1* | 2/2022 | Huang | H04L 1/1854 |
| 2022/0095366 A1 | 3/2022 | Lee et al. | |
| 2022/0167313 A1* | 5/2022 | Zhou | H04W 72/0406 |
| 2022/0174657 A1* | 6/2022 | Wang | H04L 27/2607 |
| 2022/0174774 A1* | 6/2022 | Tseng | H04W 72/1263 |
| 2022/0182985 A1* | 6/2022 | Ding | H04W 72/085 |
| 2022/0191837 A1* | 6/2022 | Ding | H04W 72/04 |
| 2022/0225375 A1 | 7/2022 | Wang et al. | |
| 2022/0255680 A1* | 8/2022 | Moon | H04W 72/21 |
| 2022/0256525 A1* | 8/2022 | Lin | H04W 88/06 |
| 2022/0256579 A1* | 8/2022 | Ji | H04L 1/1893 |
| 2023/0054292 A1* | 2/2023 | Yao | H04W 72/23 |

OTHER PUBLICATIONS

International Search Report and Written Opinion—PCT/US2021/063054—ISA/EPO—Apr. 5, 2022.
OPPO: "Discussion on Mode 2 Resource Allocation in NR-V2X", 3GPP Draft, 3GPP TSG-RAN WG1 AH Meeting #1901, R1-1900289, Mode 2 RA, 3rd Generation Partnership Project (3GPP), Mobile Competence Centre, 650, Route Des Lucioles, F-06921, Sophia-Antipolis Cedex, France, vol. RAN WG1, No. Taipei, Jan. 12, 2019-Jan. 25, 2019, Jan. 20, 2019 (Jan. 20, 2019), XP051593203, 11 pages, Retrieved from the Internet: URL: http://www.3gpp.org/ftp/Meetings%5F3GPP%5FSYNC/RAN1/Docs/R1%2D1900289%2Ezip [retrieved on Jan. 20, 2019] section "2.2 Sub-mode 2(d)".
Qualcomm Incorporated: "Feature Lead Summary of In-Device Coexistence Aspects in NR-V2X (AI 7.2.4.4)", 3GPP Draft, 3GPP TSG RAN WG1 #98bis, R1-1911684, Feature Lead Summary_NR_V2X-AI7.2.4.4-Coexistence, 3rd Generation Partnership Project (3GPP), Mobile Competence Centre, 650, Route Des Lucioles, F-06921 Sophia-Antipolis Cedex, vol. RAN WG1, No. Chongqing, China, Oct. 14, 2019-Oct. 20, 2019, Oct. 22, 2019 (Oct. 22, 2019), XP051798926, 6 Pages, Retrieved from the Internet: URL: https://ftp.3gpp.org/tsg_ran/WG1_RL1/TSGR1_98b/Docs/R1-1911684.zip R1-1911684_Feature lead Summary_NR_V2X-AI7.2.4.4-Coexistence.docx [retrieved on Oct. 22, 2019] The whole document.
Fujitsu: "Discussion on Physical Layer Procedure for Nr V2X", 3GPP TSG RAN WG1 #98bis R1-1910139, Chongqing, China, Oct. 14-20, 2019, pp. 1-8.
NEC: "Physical Layer Procedures for NR Sidelink", 3GPP TSG RAN WG1 #98bis, R1-1911030, Chongqing, China, Oct. 14-20, 2019, pp. 1-8.
Oppo: "Physical Layer Procedure for NR-V2X Sidelink," 3GPP Draft, 3GPP TSG RAN WG1 #98bis, R1-1910375, Phy Layer Procedure, 3rd Generation Partnership Project (3GPP), Mobile Competence Centre, 650, Route Des Lucioles, F-06921, Sophia-Antipolis Cedex, France, vol. RAN WG1, No. Chongqing, China, Oct. 14, 2019-Oct. 20, 2019, Oct. 8, 2019 (Oct. 8, 2019), XP051809105, 12 p. section 2.2; p. 3 sections: 2.7 and 3, p. 6-p. 7, section 8, p. 12.

* cited by examiner

SCHEDULING CONFLICT RESOLUTION FOR OVERLAPPING SIDELINK TRANSMISSIONS

The following relates to wireless communications, including techniques for scheduling sidelink communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a first wireless device is described. The method may include receiving, from a second wireless device and via a sidelink communication link, sidelink control information scheduling a first transmission to be transmitted by the first wireless device to the second wireless device on a first set of resources in a dedicated resource pool for sidelink control signaling, receiving an indication that a second transmission is scheduled to be transmitted by the first wireless device on a second set of resources, the second set of resources at least partially overlapping in time with the first set of resources, and transmitting at least one of the first transmission or the second transmission in accordance with a conflict resolution rule based on the second set of resources at least partially overlapping with the first set of resources.

An apparatus for wireless communications at a first wireless device is described. The apparatus may include a processor and memory coupled to the processor. The processor and memory may be configured to receive, from a second wireless device and via a sidelink communication link, sidelink control information scheduling a first transmission to be transmitted by the first wireless device to the second wireless device on a first set of resources in a dedicated resource pool for sidelink control signaling, receive an indication that a second transmission is scheduled to be transmitted by the first wireless device on a second set of resources, the second set of resources at least partially overlapping in time with the first set of resources, and transmit at least one of the first transmission or the second transmission in accordance with a conflict resolution rule based on the second set of resources at least partially overlapping with the first set of resources.

Another apparatus for wireless communications at a first wireless device is described. The apparatus may include means for receiving, from a second wireless device and via a sidelink communication link, sidelink control information scheduling a first transmission to be transmitted by the first wireless device to the second wireless device on a first set of resources in a dedicated resource pool for sidelink control signaling, means for receiving an indication that a second transmission is scheduled to be transmitted by the first wireless device on a second set of resources, the second set of resources at least partially overlapping in time with the first set of resources, and means for transmitting at least one of the first transmission or the second transmission in accordance with a conflict resolution rule based on the second set of resources at least partially overlapping with the first set of resources.

A non-transitory computer-readable medium storing code for wireless communications at a first wireless device is described. The code may include instructions executable by a processor to receive, from a second wireless device and via a sidelink communication link, sidelink control information scheduling a first transmission to be transmitted by the first wireless device to the second wireless device on a first set of resources in a dedicated resource pool for sidelink control signaling, receive an indication that a second transmission is scheduled to be transmitted by the first wireless device on a second set of resources, the second set of resources at least partially overlapping in time with the first set of resources, and transmit at least one of the first transmission or the second transmission in accordance with a conflict resolution rule based on the second set of resources at least partially overlapping with the first set of resources.

Some examples of the method, apparatuses, and non-transitory computer-readable medium described herein may further include operations, features, means, or instructions for transmitting the first transmission on the first set of resources and dropping the second transmission on the second set of resources in accordance with the conflict resolution rule based at last in part on a higher priority of a content of the first transmission.

Some examples of the method, apparatuses, and non-transitory computer-readable medium described herein may further include operations, features, means, or instructions for transmitting the second transmission on the second set of resources and dropping the first transmission on the first set of resources in accordance with the conflict resolution rule based at last in part on a lower priority of a content of the first transmission.

Some examples of the method, apparatuses, and non-transitory computer-readable medium described herein may further include operations, features, means, or instructions for multiplexing the first transmission with the second transmission on the second set of resources, where the second transmission may be rate matched according to the first transmission.

In some examples of the method, apparatuses, and non-transitory computer-readable medium described herein, a content of the first transmission may be transmitted on a subset of the second set of resources in accordance with the conflict resolution rule.

In some examples of the method, apparatuses, and non-transitory computer-readable medium described herein, a hybrid automatic repeat request field, a scheduling request, a first part of channel state information, a second part of channel state information, or any combination thereof, each correspond to a respective configured portion of the subset of the second set of resources.

In some examples of the method, apparatuses, and non-transitory computer-readable medium described herein, frequency division multiplexing or time division multiplexing the first transmission with the second transmission on the second set of resources based on a format of the first transmission.

In some examples of the method, apparatuses, and non-transitory computer-readable medium described herein, the first transmission may be frequency division multiplexed with the second transmission based on the format of the first transmission being a long format.

In some examples of the method, apparatuses, and non-transitory computer-readable medium described herein, the first transmission may be time division multiplexed with the second transmission based on the format of the first transmission being a short format.

Some examples of the method, apparatuses, and non-transitory computer-readable medium described herein may further include operations, features, means, or instructions for puncturing at least a portion of the first transmission or the second transmission.

Some examples of the method, apparatuses, and non-transitory computer-readable medium described herein may further include operations, features, means, or instructions for transmitting, with at least partial time domain overlap, the first transmission on the first set of resources and the second transmission on the second set of resources.

Some examples of the method, apparatuses, and non-transitory computer-readable medium described herein may further include operations, features, means, or instructions for dropping one or more resource blocks of the first transmission that overlap in time or frequency, or both, with the second transmission, transmitting a remaining portion of the first transmission on a portion of the first set of resources, and transmitting the second transmission on the second set of resources.

Some examples of the method, apparatuses, and non-transitory computer-readable medium described herein may further include operations, features, means, or instructions for multiplexing the second transmission and the first transmission on the first set of resources or the second set of resources based on the first transmission and the second transmission completely overlapping in time.

In some examples of the method, apparatuses, and non-transitory computer-readable medium described herein, the first transmission may be multiplexed in the second transmission based on the first transmission having a short format and the second transmission having a long format, or the second transmission may be multiplexed in the first transmission based on the first transmission having the long format and the second transmission having the short format.

In some examples of the method, apparatuses, and non-transitory computer-readable medium described herein, the first transmission may be a sidelink uplink control information transmission, and the second transmission may be a second shared channel transmission.

In some examples of the method, apparatuses, and non-transitory computer-readable medium described herein, the first transmission may be a first sidelink uplink control information transmission, and the second transmission may be a second sidelink uplink control information transmission.

A method for wireless communications at a second wireless device is described. The method may include transmitting, to a first wireless device and via a sidelink communication link, sidelink control information scheduling a first transmission from the first wireless device to the second wireless device on a first set of resources in a dedicated resource pool for sidelink control signaling, transmitting an indication that a second transmission is scheduled to be transmitted by the first wireless device on a second set of resources to the second wireless device, the second set of resources at least partially overlapping in time with the first set of resources, and receiving at least one of the first transmission or the second transmission in accordance with a conflict resolution rule based on the second set of resources at least partially overlapping with the first set of resources.

An apparatus for wireless communications at a second wireless device is described. The apparatus may include a processor and memory coupled to the processor. The processor and memory may be configured to transmit, to a first wireless device and via a sidelink communication link, sidelink control information scheduling a first transmission from the first wireless device to the second wireless device on a first set of resources in a dedicated resource pool for sidelink control signaling, transmit an indication that a second transmission is scheduled to be transmitted by the first wireless device on a second set of resources to the second wireless device, the second set of resources at least partially overlapping in time with the first set of resources, and receive at least one of the first transmission or the second transmission in accordance with a conflict resolution rule based on the second set of resources at least partially overlapping with the first set of resources.

Another apparatus for wireless communications at a second wireless device is described. The apparatus may include means for transmitting, to a first wireless device and via a sidelink communication link, sidelink control information scheduling a first transmission from the first wireless device to the second wireless device on a first set of resources in a dedicated resource pool for sidelink control signaling, means for transmitting an indication that a second transmission is scheduled to be transmitted by the first wireless device on a second set of resources to the second wireless device, the second set of resources at least partially overlapping in time with the first set of resources, and means for receiving at least one of the first transmission or the second transmission in accordance with a conflict resolution rule based on the second set of resources at least partially overlapping with the first set of resources.

A non-transitory computer-readable medium storing code for wireless communications at a second wireless device is described. The code may include instructions executable by a processor to transmit, to a first wireless device and via a sidelink communication link, sidelink control information scheduling a first transmission from the first wireless device to the second wireless device on a first set of resources in a dedicated resource pool for sidelink control signaling, transmit an indication that a second transmission is scheduled to be transmitted by the first wireless device on a second set of resources to the second wireless device, the second set of resources at least partially overlapping in time with the first set of resources, and receive at least one of the first transmission or the second transmission in accordance with a conflict resolution rule based on the second set of resources at least partially overlapping with the first set of resources.

Some examples of the method, apparatuses, and non-transitory computer-readable medium described herein may further include operations, features, means, or instructions for obtaining the first transmission and the second transmission on the second set of resources, where the second transmission may be rate matched according to the first transmission.

In some examples of the method, apparatuses, and non-transitory computer-readable medium described herein, a content of the first transmission may be received on a subset of the second set of resources in accordance with the conflict resolution rule.

In some examples of the method, apparatuses, and non-transitory computer-readable medium described herein, a hybrid automatic repeat request field, a scheduling request, a first part of channel state information, a second part of channel state information, or any combination thereof, each correspond to a respective configured portion of the subset of the second set of resources.

Some examples of the method, apparatuses, and non-transitory computer-readable medium described herein may further include operations, features, means, or instructions for receiving the first transmission and the second transmission frequency division multiplexed or time division multiplexed together on the second set of resources based on a format of the first transmission.

In some examples of the method, apparatuses, and non-transitory computer-readable medium described herein, the first transmission may be frequency division multiplexed with the second transmission based on the format of the first transmission being a long format.

In some examples of the method, apparatuses, and non-transitory computer-readable medium described herein, the first transmission may be time division multiplexed with the second transmission based on the format of the first transmission being a short format.

In some examples of the method, apparatuses, and non-transitory computer-readable medium described herein, the first transmission at least partially punctures the second transmission on the second set of resources.

Some examples of the method, apparatuses, and non-transitory computer-readable medium described herein may further include operations, features, means, or instructions for receiving, at least partially concurrently, the first transmission on the first set of resources and the second transmission on the second set of resources.

Some examples of the method, apparatuses, and non-transitory computer-readable medium described herein may further include operations, features, means, or instructions for determining one or more resource blocks of the second transmission that overlap in time or frequency, or both, with the first transmission may have been dropped, receiving the first transmission on the first set of resources, and receiving a remaining portion of the second transmission on a portion of the second set of resources based on the one or more resource blocks of the second transmission being dropped.

Some examples of the method, apparatuses, and non-transitory computer-readable medium described herein may further include operations, features, means, or instructions for receiving the second transmission and the first transmission multiplexed together on the first set of resources or the second set of resources based on the first transmission and the second transmission completely overlapping in time.

DETAILED DESCRIPTION

Figure 1:
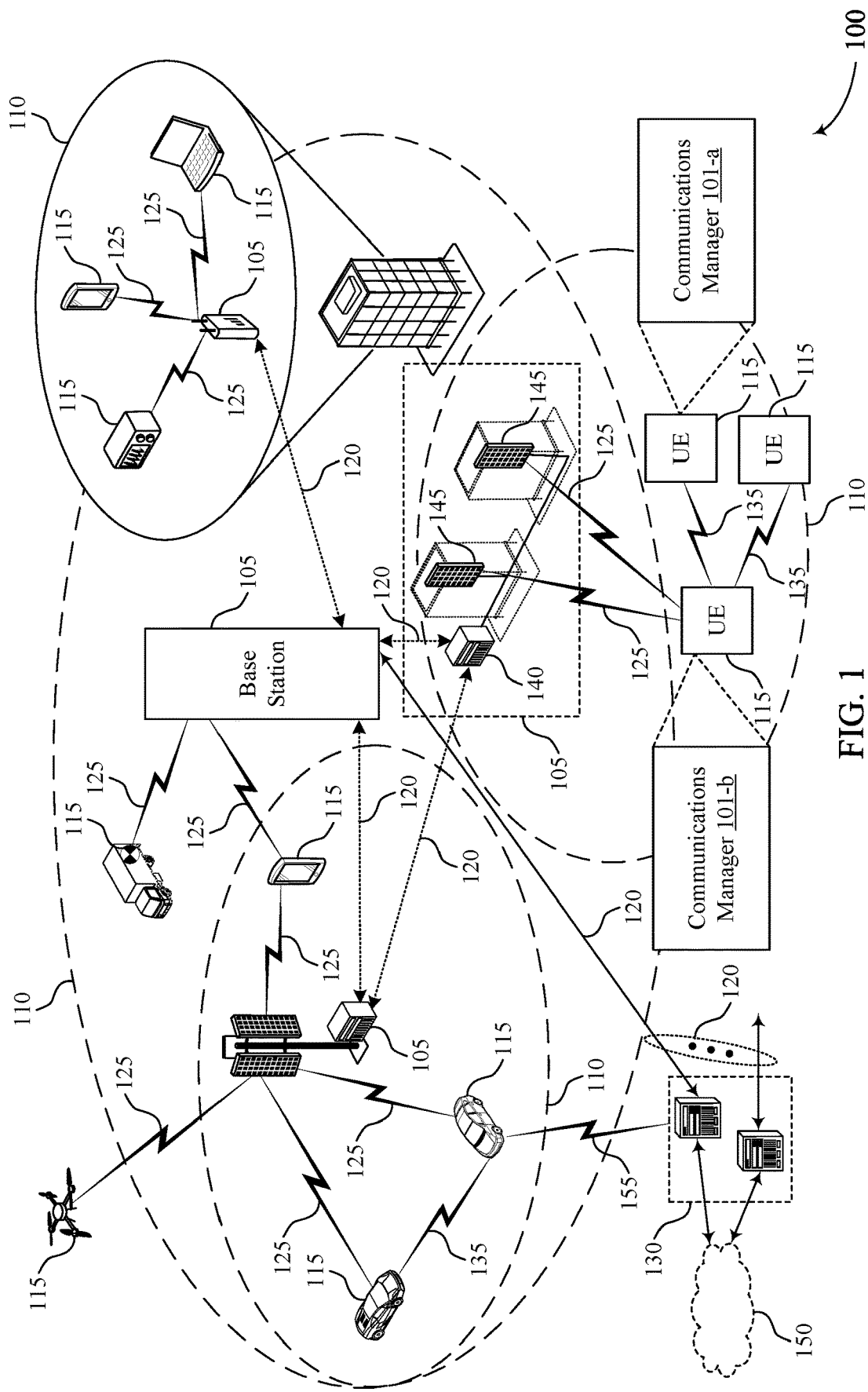
FIG. 1 illustrates an example of a wireless communications system that supports scheduling conflict resolution for overlapping sidelink transmissions in accordance with aspects of the present disclosure.

A wireless communications system that supports sidelink communications may allocate resources for the sidelink communications. Some sidelink signaling between wireless devices may be communicated on sidelink channels such as a physical sidelink control channel (PSCCH) or a physical sidelink shared channel (PSSCH). In some systems, sidelink control information (SCI) may be transmitted between the wireless devices via two different messages. A first type of SCI, SCI-1, may be broadcast on PSCCH and may provide scheduling information for PSSCH. In some cases, SCI-1 may include information for a second type of SCI, SCI-2, which may be transmitted on PSSCH. In some wireless communications systems, PSCCH information may be transmitted in conjunction with PSSCH information. For example, a PSCCH signal may be transmitted based on there being a corresponding PSSCH signal in some systems. However, a wireless device may have sidelink control messages to transmit even in the absence of a pending sidelink data transmission.

Wireless communications systems described herein support a dedicated resource pool for sidelink control signaling. These techniques may enable devices to send sidelink control signaling without an associated PSSCH resource, which may decrease latency or increase resource utilization for some wireless communications systems. For example, in an industrial Internet of Things (I-IoT) network, a programmable logic controller (PLC) may interface between a base station and multiple sensors-actuators (S/As) or UEs. The S/As may use sidelink communication protocols to communicate with associated anchor PLCs, and the S/As and the PLCs may frequently exchange control information, such as inter-UE coordination messages, without corresponding sidelink data. In some cases, the dedicated resource pool may be used to transmit sidelink uplink control information (S-UCI) and sidelink downlink control information (S-DCI). S-UCI may refer to a sidelink control message which is transmitted from an S/A to a PLC, and S-DCI may refer to a sidelink control message which is transmitted from the PLC to the S/A.

In some cases, an S/A may be scheduled for a sidelink control message which overlaps with another sidelink transmission. For example, the S/A may be scheduled for a first sidelink transmission, which may be an S-UCI transmission on a first set of resources in a dedicated resource pool. The S/A may also be scheduled for a second sidelink transmission on a second set of resources which at least partially overlaps with the first set of resources. In some cases, the second transmission may be a PSSCH transmission. In another example, the second sidelink transmission may be another S-UCI transmission. The S/A may implement techniques to resolve the scheduling conflict between the first sidelink transmission and the second sidelink transmission. For example, the S/A may drop one of the sidelink transmissions. Additionally, or alternatively, the S/A may multiplex the first and second sidelink transmissions together (e.g., via frequency division multiplexing (FDM) or time division multiplexing (TDM)). In some cases, the S/A may drop or puncture an overlapping portion of the first sidelink transmission or second sidelink transmission. The S/A may resolve the scheduling conflict based on a priority of information packets in the first sidelink transmission and the second sidelink transmission. In some cases, a PLC may be configured with, or implement, similar techniques to resolve the scheduling conflict or determine how the S/A resolved the scheduling conflict. For example, the PLC may determine whether the S/A dropped a portion of a transmission or multiplexed the transmissions together so the PLC can coherently receive one or more of the transmissions.

Aspects of the disclosure are initially described in the context of wireless communications systems. Aspects of the disclosure are further illustrated by and described with reference to apparatus diagrams, system diagrams, and flowcharts that relate to scheduling conflict resolution for overlapping sidelink transmissions.

FIG. 1 illustrates an example of a wireless communications system 100 that supports scheduling conflict resolution for overlapping sidelink transmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of TDM techniques, FDM techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA).

Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information (CSI) reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may implement aspects of an I-IoT network. In some cases, I-IoT networks may have strict latency requirements (e.g., 1-2 ms latency) as well as high reliability requirements (e.g., $10^{-6}$ error rate). In such cases, carrying out all communications directly between a base station 105 and S/As may affect latency and reliability. Some I-IoT networks may implement PLCs as an interface between the S/As and the base station 105, as sidelink communications between a PLC and S/As may enable for direct communications which may reduce latency and improve reliability. In some cases, an S/A may be an example of a client device. In some cases, a PLC may be referred to as an anchor.

In some cases, a PLC may support multiple S/As or UEs 115. PLCs may be used for simple and flexible deployment of S/As and may support, or control, up to one hundred S/As. Moreover, by enabling for PLCs to schedule transmissions for S/As, processing capabilities, supported bandwidths, and complexities of S/As may be significantly reduced as compared to PLCs. Traffic within an I-IoT network may be deterministic, with small packet sizes (e.g., 32-256 bytes). Thus, a bandwidth of transmissions within an I-IoT network may be relatively low (e.g., bandwidth of two resource blocks). However, an overall bandwidth for an I-IoT network may be relatively large, and may include dedicated frequency bands, unlicensed frequency bands, or both.

S-UCI may refer to control information which is transmitted from an S/A to a PLC. In this regard, S-UCI may be referred to as an uplink transmission, an uplink sidelink transmission, or a reverse-link transmission. Conversely, S-DCI may refer to control information which is transmitted from a PLC to a S/A. In this regard, S-DCI may be referred to as a downlink transmission, a downlink sidelink transmission, or a forward-link transmission.

In some aspects, the D2D communication links 135 between the respective wireless devices (e.g., sidelink communication links) may be included within a sidelink network of the wireless communications system 100. The sidelink network may be configurable to operate in a "Mode 1" and/or a "Mode 2." While operating in Mode 1, the sidelink network may be managed, or coordinated, by a base station 105. During Mode 1 operation, the base station 105 may manage resource allocation over the sidelink communication links and may allocate sets of resources on the sidelink communication links to devices, such as UEs 115, S/As, and PLCs. In some cases, the base station 105 may allocate sets of sidelink resources to the wireless devices during Mode 1 operation via RRC signaling, downlink control information (DCI) messages (e.g., DCI 3_0), or both. During Mode 1 operation, the base station 105 may allocate sidelink resources via dynamic grants, configured grants (e.g., type 1 configured grants, type 2 configured grants), or both. Within Mode 1 operation, a modulation and coding scheme (MCS) used for transmissions across the sidelink communication links may be managed by the respective wireless devices. The MCS may be configured to be within limits which may be configured at the wireless devices or signaled by the base station 105.

Comparatively, while operating in Mode 2, scheduling determinations for sidelink network may not be managed, or coordinated, by the base station 105. Without coordination or management of the resources of the sidelink network during the Mode 2 operation, the wireless devices may be configured to monitor the sidelink network, and determine sets of sidelink resources which are available for transmission of sidelink signals via the sidelink communication links. In particular, a PLC may "autonomously" determine sidelink resources which may be used by monitoring the sidelink communication links or performing channel sensing. In some cases, the PLC may blindly decode all PSCCH channels within the sidelink communication links to identify sidelink resources which have been reserved by other wireless devices. Subsequently, the PLC may report available sidelink resources to the upper layer and may allocate sets of sidelink resources to one or more S/As. Mode 2 operation of the sidelink network may follow contention-based access procedures in which S/As, PLCs, or both, contend for the use sidelink resources.

In the context of cellular vehicle-to-everything (C-V2X) communications, wireless devices may be configured to perform blind decoding for all sidelink subchannels. The number of sidelink subchannels within a sidelink network may be relatively small (e.g., approximately 1-27 subchannels within a resource pool) such that blind decoding of all subchannels is still feasible. Moreover, in a sidelink communication link, PSCCH and PSSCH may be transmitted within a same slot. In particular, PSSCH may occupy up to $N_{subchannels}^{SL}$ subchannels contiguous subchannels, where PSCCH may occupy a quantity of physical resource blocks (PRBs) (e.g., 10 PRBs, 12 PRBs, 15 PRBs, 25 PRBs, 50 PRBs, 75 PRBs, 100 PRBs) up to one subchannel (e.g., subchannel with lowest subchannel index). For example, a PSCCH may be fixed to a quantity of symbols of a defined percentage (e.g., 10-100%) of a single subchannel. Moreover, a PSCCH of a sidelink communication link may be configured (e.g., pre-configured) up to two or three symbols (e.g., first 2-3 symbols). A subchannel size for a sidelink communication link may be relatively large (e.g., relatively large (e.g., 10-100 PRBs)).

Sidelink signaling between wireless devices may be communicated on sidelink channels, such as PSCCH and PSSCH. SCI (e.g., SCI 1_0) may be transmitted between the participating wireless devices via two different messages, SCI-1 and SCI-2. SCI-1 may be broadcast during via PSCCH and provides, among other information, details regarding SCI-2, which may be transmitted via PSSCH. SCI-1 may be used to schedule transmissions including sidelink-related control information (e.g., S-UCI, S-DCI), and may be transmitted only within PSCCH. Information which may be included within SCI-1 may include, but is not limited to, information regarding PSSCH bandwidth, frequency allocation bits (e.g., frequency domain resource allocation (FDRA) bits), time resource allocation bits (e.g., time domain resource allocation (TDRA) bits), information regarding a resource reservation period, demodulation reference signal (DMRS) pattern bits for sidelink communications, bits indicating a format of SCI-2, beta offset bits for rate matching, DMRS port bits, bits to indicate an MCS for sidelink communications (e.g., MCS table), physical sidelink feedback channel (PSFCH) overhead indicator bits, and the like. In some cases, SCI-1 may be transmitted by wireless devices to support channel sensing and to avoid resource collision.

In some cases, SCI-1 may include information to enable other wireless devices to receive and decode information included within SCI-2. Information included within SCI-2 may include, but is not limited to, HARQ identifier bits, new data indicator (NDI) bits, redundancy version (RV) bits, source/destination identifier bits, HARQ enable/disable bits, cast type bits, CSI request bits, zone identifier bits, communication range bits, and the like.

However, in some systems, PSCCH information (including SCI-1) may be transmitted in conjunction with PSSCH information. For example, SCI may not be transmitted in the absence of PSSCH data in some systems. However, devices in some systems, such as I-IoT systems, may have sidelink-related control information to transmit even in the absence of any sidelink data transmissions.

Accordingly, the wireless communications system 100 may provide for the scheduling and transmission of control information (e.g., S-UCI) via a sidelink communication link even in the absence of sidelink data transmissions. In some cases, the wireless communications system 100 may support techniques which enable for control information to be scheduled via SCI-2, thereby enabling for control information to be scheduled within a wireless communications link in the absence of PSSCH data. In some aspects, control information scheduled by the SCI-2 may include S-UCI. By enabling for sidelink-related control information (e.g., S-UCI) to be scheduled via SCI-2, techniques described herein may reduce a latency of sidelink communications and may improve resource utilization of sidelink resources.

In some cases, the wireless communications system 100 may support a dedicated resource pool for sidelink control messages, such as S-UCI and S-DCI. For example, a first wireless device (e.g., a first UE 115 or S/A) of the wireless communications system 100 may receive SCI-2 from a second wireless device (e.g., a second UE 115 or a PLC), where the SCI-2 schedules an uplink transmission (e.g., S-UCI) transmission from the first wireless device to the second wireless device via resources in the dedicated resource pool. Additionally, or alternatively, the first wireless device may receive S-DCI scheduling the uplink transmission from the first wireless device to the second wireless device via resources in the dedicated resource pool. The dedicated resource pool may include a finer granularity in resource allocation. For example, the dedicated resource pool may be scheduled according to a mini-slot or symbol level in the time domain (e.g., via TDRA). In some cases, the dedicated resource pool may be scheduled according to a resource element, resource block, resource element group, or control channel element level in the frequency domain (e.g., via FDRA).

In some cases, the dedicated resource pool may be FDMed with a sidelink resource pool used for PSCCH and PSSCH. In some cases, the dedicated resource pool may be a subset of PRBs within a configured subchannel. In some cases, the dedicated resource pool may be left-over PRBs in an upper edge of a sidelink resource pool. In some examples, one or more subchannels may be used for the dedicated resource pool, such as subchannels at the edges of a resource pool for sidelink signaling. In some cases, some additional resources within a sidelink BWP may be configured for the dedicated resource pool. Any one or more of the above techniques for configuring a dedicated resource pool for sidelink control messages may be implemented.

In some cases, the dedicated resource pool for S-UCI and S-DCI may support a flexible SCI payload size and format. For example, a UE 115 may be scheduled different SCI formats with different payload sizes. In some cases, the UE 115 may be scheduled different SCI formats with different coverage or reliability requirements in the dedicated resource pool. For example, the UE 115 may be configured for SCI repetition or aggregation for coverage enhancement, or the UE 115 may be scheduled according to a long or short SCI format for different payload sizes. For example, the UE 115 may be scheduled for a feedback (e.g., acknowledgment/negative acknowledgment) transmission, CSI reporting, or inter-UE coordination messages.

In some cases, the dedicated resource pool may be accessed by a UE 115 after performing a contention procedure. For example, a UE 115 may reserve resources after performing a clear channel assessment (CCA) or perform a contention-based procedure. In some other examples, the UE 115 may be scheduled to use resources in the dedicated resource pool. For example, a PLC or a base station 105 may schedule the UE 115 with resources in the dedicated resource pool. In some cases, if the dedicated resource pool is scheduled by another wireless device (e.g., a PLC), a UE 115, or an S/A, may be scheduled for overlapping sidelink transmissions.

Techniques described herein may enable a wireless device to resolve a scheduling conflict between sidelink transmissions. For example, an S/A may be scheduled for a first sidelink transmission, which may be an S-UCI transmission on a first set of resources in a dedicated resource pool. The S/A may also be scheduled for a second sidelink transmission on a second set of resources which at least partially overlap with the first set of resources. In some cases, the second transmission may be a PSSCH transmission. In another example, the second sidelink transmission may be another S-UCI transmission, and the second set of resources may also be in the dedicated resource pool. The S/A may implement techniques to resolve the scheduling conflict between the first sidelink transmission and the second sidelink transmission. For example, the S/A may drop the first sidelink transmission or the second sidelink transmission.

Additionally, or alternatively, the S/A may multiplex the first and second sidelink transmissions together (e.g., via FDM techniques or TDM techniques). In some cases, the S/A may drop or puncture an overlapping portion of the first sidelink transmission or second sidelink transmission.

In some cases, the S/A may resolve the scheduling conflict based on a priority of information in the first sidelink transmission and the second sidelink transmission. In some cases, the priority of an S-UCI carrying a scheduling request may be the same as the priority of the traffic that requires resource. The priority of an S-UCI carrying HARQ feedback may also be based on the associated traffic. An inter-UE coordination signaling may be assigned a physical (PHY) or MAC layer priority by an upper layer, such as via RRC signaling. In some cases, a PLC may be configured with, or implement, similar techniques to resolve the scheduling conflict or determine how the S/A resolved the scheduling conflict. For example, the PLC may determine whether the S/A dropped a portion of a transmission or multiplexed the transmissions together so the PLC can coherently receive one or more of the transmissions.

In various examples, a communication manager 101 may be included in a device to support resolving a scheduling conflict for overlapping sidelink transmissions. For example, a UE 115 may include a communications manager 101-a or a communications manager 101-b, or both. For example, a UE 115 which is an example of an S/A may include a communications manager 101-a, and a UE 115 which may be a PLC may include a communications manager 101-b.

In some examples, a communication managers 101-a may receive, from a second wireless device and via a sidelink communication link, SCI scheduling a first transmission to be transmitted by the first wireless device to the second wireless device on a first set of resources in a dedicated resource pool for sidelink control signaling. The communication managers 101-a may receive an indication that a second transmission is scheduled to be transmitted by the first wireless device on a second set of resources, the second set of resources at least partially overlapping in time with the first set of resources. The communication managers 101-a may transmit at least one of the first transmission or the second transmission in accordance with a conflict resolution rule based on the second set of resources at least partially overlapping with the first set of resources.

In some examples, a communication managers 101-b may transmit, to a first wireless device and via a sidelink communication link, sidelink control information scheduling a first transmission from the first wireless device to the second wireless device on a first set of resources in a dedicated resource pool for sidelink control signaling. The communication managers 101-b may transmit an indication that a second transmission is scheduled to be transmitted by the first wireless device on a second set of resources to the second wireless device, the second set of resources at least partially overlapping in time with the first set of resources. The communication managers 101-b may receive at least one of the first transmission or the second transmission in accordance with a conflict resolution rule based on the second set of resources at least partially overlapping with the first set of resources.

Figure 2:
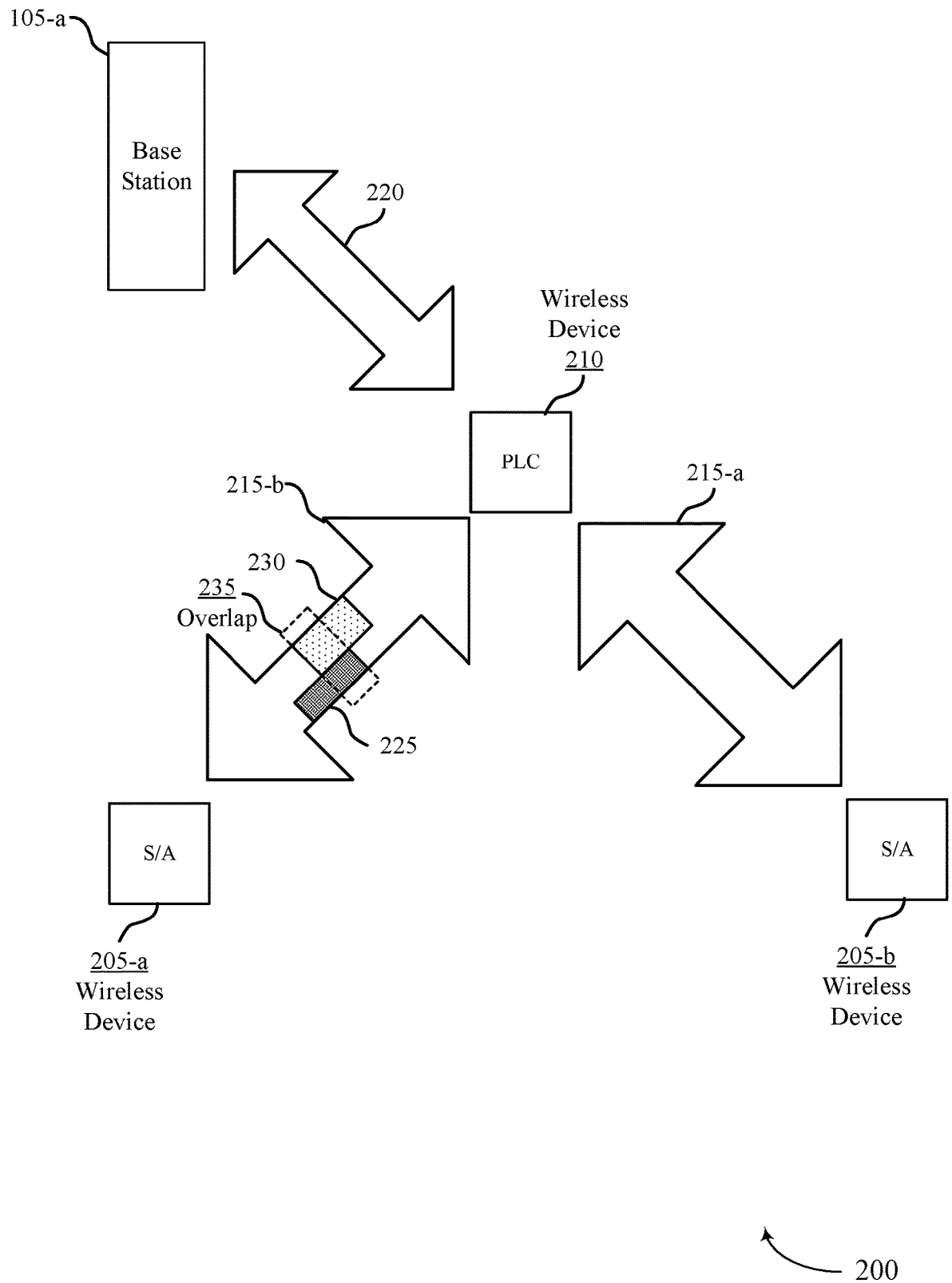
FIG. 2 illustrates an example of a wireless communications system that supports scheduling conflict resolution for overlapping sidelink transmissions in accordance with aspects of the present disclosure.

FIG. 2 illustrates an example of a wireless communications system 200 that supports scheduling conflict resolution for overlapping sidelink transmissions in accordance with aspects of the present disclosure. The wireless communications system 200 may include a base station 105-a and one or more wireless devices 205, such as a first wireless device 205-a, a second wireless device 210, and a third wireless device 205-b. The base station 105-a may be an example of a base station 105 described with reference to FIG. 1. The first wireless device 205-a, the second wireless device 210, and the third wireless device 205-b may each be an example of a UE 115 as described with reference to FIG. 1.

The second wireless device 210 may communicate with the base station 105-a directly using a communication link 220. The first wireless device 205-a, the second wireless device 210, and the third wireless device 205-b may communicate using communication links 220. A communication link 220 may be an example of a sidelink communication link or a PC5 link. For example, the first wireless device 205-a may communicate with the second wireless device 210 via communication link 220-a, and the third wireless device 205-b may communicate with the second wireless device 210 via communication link 220-b. In some cases, one or more of the first wireless device 205-a or the third wireless device 205-b may have direct communication links with the base station 105-a.

In some cases, the wireless communications system 200 may implement aspects of an I-IoT network. For example, the second wireless device 210 may be an example of a PLC. The first wireless device 205-a and the third wireless device 205-b may each be an example of an S/A. An I-IoT network may include one or more PLCs, each of which may serve one or more S/As. In some cases, a PLC may support multiple S/As, UEs 115, or wireless devices 205. S/As in an I-IoT network may exchange control signaling with a PLC, such as feedback, CSI reporting, or inter-UE coordination messages. S-UCI may refer to control information which is transmitted from an S/A to a PLC. For example, S-UCI may be an example of a control message transmitted from the first wireless device 205-a or the third wireless device 205-b to the second wireless device 210. Conversely, S-DCI may refer to control information which is transmitted from a PLC to a S/A. For example, S-DCI may be an example of a control message transmitted from the second wireless device 210 to the first wireless device 205-a or the third wireless device 205-b.

The wireless communications system 200 may support techniques to schedule and communicate sidelink control messages (e.g., S-UCI) without an accompanying sidelink data transmission. For example, the wireless communications system 200 may support scheduling sidelink control messages via SCI-2, enabling sidelink control messages to be scheduled even without a corresponding PSSCH. For example, an SCI-2 may schedule S-UCI.

The wireless communications system 200 may support a dedicated resource pool for S-UCI and S-DCI signaling. For example, the dedicated resource pool may be used to send control messages for inter-UE coordination, HARQ feedback, CSI reporting, scheduling requests, slot format indications, or any combination thereof, among other types of control signaling. In some cases, the dedicated resource pool may be FDMed with a sidelink resource pool used for PSCCH and PSSCH.

The dedicated resource pool may have a finer granularity in resource allocation than other portions of a communication link 220 for sidelink signaling. For example, an S/A may be scheduled in the time domain according to mini-slot or symbol-level granularity for the dedicated resource pool. In some cases, the S/A may be scheduled in the frequency domain according to a resource block, resource element, resource element group, or control channel element-level granularity for the dedicated resource pool. For example, the first wireless device 205-a may receive control signaling scheduling the first wireless device 205-a for a sidelink control message on the dedicated resource pool including a TDRA with a mini-slot-level granularity and an FDRA with a resource block-level granularity.

The wireless communications system 200 may support a flexible SCI payload size and flexible SCI format for sidelink control messages on the dedicated resource pool. For example, an S/A may be scheduled according to different SCI formats with different payload sizes or different coverage or reliability requirements. In an example, an S/A may be configured for SCI repetition or SCI aggregation to improve coverage. In some cases, an S/A may be scheduled according to a long or short SCI format for different payload sizes. For example, a feedback transmission, a CSI report, and inter-UE coordination messages may have different payload sizes, and the S/A may be accordingly configured to use a long or short SCI format based on the content of a pending control message or a channel condition of the sidelink channel, or both. A long SCI format may have more bits than a short SCI format. For example, if a S-UCI transmission has more than a threshold number of bits, the S/A may be configured to use a long SCI format. If the S-UCI transmission has fewer bits or an equal number of bits than the threshold number of bits, the S/A may be configured to use a short SCI format.

In some cases, base station 105-a may configure the dedicated resource pool. The base station 105-a may transmit an indication of the dedicated set of resources to one or more PLCs of the wireless communications system 200 (e.g., including the second wireless device 210). In some cases, a PLC may indicate the dedicated resource pool to one or more S/As served by the PLC. For example, the second wireless device 210 may indicate the dedicated resource pool to the first wireless device 205-a and the third wireless device 205-b. Additionally, or alternatively, the base station 105-a may indicate the dedicated resource pool to the S/As via direct links. The base station 105-a may include an indication of the dedicated resource pool in an RRC message, a DCI message, a synchronization signal block (SSB) message, or any combination thereof.

An S-UCI transmission may be scheduled by a PLC, anchor device, or a base station 105. For example, An S-UCI transmission for the first wireless device 205-a may be scheduled by the second wireless device 210. In some cases, the base station 105-a may provide the second wireless device 210 resources for the S-UCI transmission in Mode 1 operation, and the second wireless device 210 may reserve resources for the S-UCI transmission in Mode 2 operation. The second wireless device 210 may schedule S/As or UEs 115 for S-UCI transmission or reception.

In some examples, a PLC may transmit SCI-2 on PSSCH to an S/A, granting resources for S-UCI in the dedicated resource pool. For example, the second wireless device 210 may transmit SCI-2 on PSSCH to schedule the first wireless device 205-a for an S-UCI transmission in the dedicated resource pool. The first wireless device 205-a may receive grant and transmit a CSI report, HARQ feedback, an inter-UE coordination message, or any combination thereof, based on the SCI-2 scheduling. In some cases, sidelink RRC signaling may include an S-UCI scheduling information element, which may include a TDRA/FDRA table, a mapping type (e.g., granularity, bundling size, interleaving, frequency hopping, etc.), and semi-persistent scheduling and configured grant parameters.

A PLC may transmit S-DCI on resources in the dedicated resource pool. In some examples, S-DCI may provide scheduling for an S-UCI or PSSCH. For example, the second wireless device 210 may transmit S-DCI to the first wireless device 205-a, scheduling the first wireless device 205-a for an S-UCI transmission in the dedicated resource pool. In some cases, S-DCI may address S/As through a sidelink receiver identifier. For example, if an S/A detects its sidelink receiver identifier in an S-DCI transmission, the S/A may determine that the PLC is addressing the S/A. In some cases, an S-DCI may be scrambled with the sidelink receiver identifier, or the S-DCI may contain the sidelink receiver identifier. Additionally, or alternatively, an S/A may be similarly addressed by the PLC through an identifier assigned to the S/A by the PLC.

In some cases, an S/A may be scheduled for overlapping sidelink transmissions. For example, wireless device 205-a may be scheduled for a first transmission 225 and a second transmission 230. A first set of resources for the first transmission 225 may have an overlap 235 in time or frequency with a second set of resources for the second transmission 230. The overlap 235 may result in a scheduling conflict for the first wireless device 205-a. The first transmission 225 may be an S-UCI transmission on a first set of resources in the dedicated sidelink pool. In some cases, the second transmission 230 may be a PSSCH transmission which may partially overlap in time with the S-UCI transmission. In some cases, the second transmission 230 may be a second S-UCI transmission which overlaps in time or frequency with the first S-UCI transmission.

The wireless communications system 200 may support techniques to resolve scheduling conflicts for overlapping sidelink transmissions. For example, the first wireless device 205-a may implement techniques to resolve the scheduling conflict between the first transmission 225 and the second transmission 230. In some cases, the first wireless device 205-a may resolve a scheduling conflict based on the information included in the first transmission 225 and the second transmission 230. In some cases, a PLC may be configured with, or implement, similar techniques to resolve the scheduling conflict or determine how the S/A resolved the scheduling conflict. For example, the PLC may determine whether the S/A dropped a portion of a transmission or multiplexed the transmissions together so the PLC can coherently receive one or more of the transmissions.

In some cases, the first wireless device 205-a may resolve a scheduling conflict where an S-UCI transmission overlaps with a PSSCH transmission. In some cases, the first wireless device 205-a may drop the S-UCI or the PSSCH to resolve the scheduling conflict. In some examples, the S-UCI may be multiplexed in the PSSCH. In some cases, the S-UCI may be FDM or TDM with the PSSCH transmission on the PSSCH. In some cases, the first wireless device 205-a may support simultaneous transmission of the S-UCI on the first set of resources and the PSSCH on the second set of resources. Some additional examples of resolving this scheduling conflict are described in more detail with reference to FIG. 3.

In some cases, the first wireless device 205-a may resolve a scheduling conflict where a first S-UCI transmission overlaps with a second S-UCI transmission. In some cases, the first wireless device 205-a may drop one of the S-UCI transmissions to resolve the scheduling conflict. In some examples, the two S-UCI transmissions may be multiplexed together, such as if the two S-UCI transmissions are scheduled on resources which completely overlap in time. In some cases, the first wireless device 205-a may drop or puncture an overlapping portion of the first S-UCI or the second S-UCI. Some additional examples of resolving this scheduling conflict are described in more detail with reference to FIG. 4.

Figure 3:
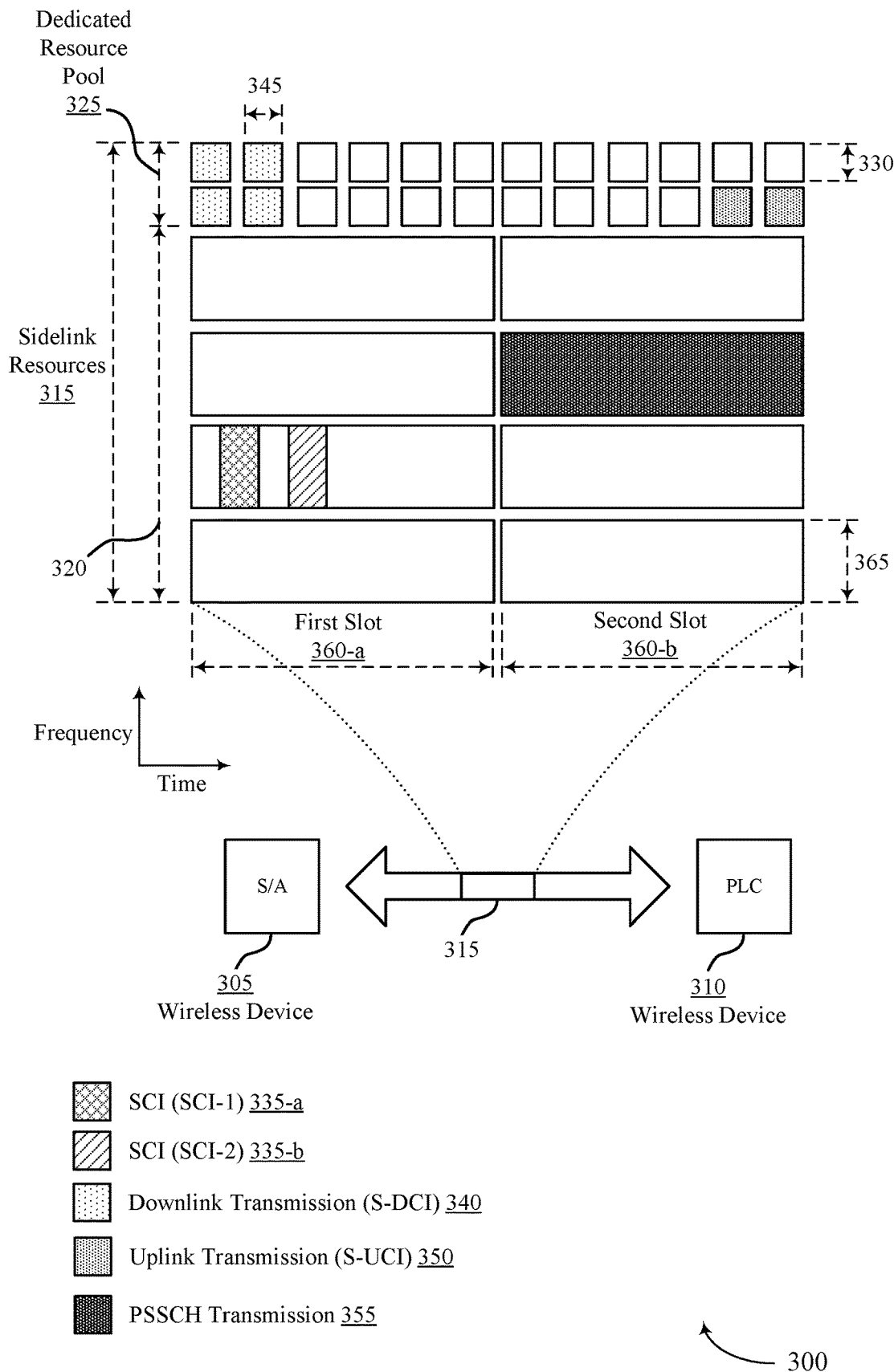
FIG. 3 illustrates an example of a resource allocation scheme that supports scheduling conflict resolution for overlapping sidelink transmissions in accordance with aspects of the present disclosure.

FIG. 3 illustrates an example of a resource allocation scheme 300 that supports scheduling conflict resolution for overlapping sidelink transmissions in accordance with aspects of the present disclosure.

The resource allocation scheme 300 illustrates a set of sidelink resources 315 which may be used for communication between devices of a wireless communications system. For example, a wireless device 305 may communicate with a wireless device 310 using the sidelink resources 315. The wireless device 305 may be an example of an S/A of an I-IoT network, and the wireless device 310 may be an example of a PLC of the I-IoT network.

The set of sidelink resources 315 may include sidelink resources in at least a first slot 360-*a* and a second slot 360-*b* in the time domain. In some cases, such as in an I-IoT network, different devices may transmit or monitor in different slots 360. For example, in the first slot 360-*a*, a PLC device in an I-IoT network may transmit, and S/A devices may listen or monitor. In the second slot 360-*b*, the PLC device may listen or monitor, and the S/A devices may transmit. In some cases, other configurations may be implemented, such as to support communications between like devices. The set of sidelink resources 315 may span multiple slots 360 or other transmission time intervals. The set of sidelink resources 315 may span one or more subchannels 365 (or other group of frequency resources) in the frequency domain. The set of sidelink resources 315 may include a set of sidelink resources associated with a sidelink communication link (e.g., communication link 220-*a* illustrated in FIG. 2) of a sidelink network.

The set of sidelink resources 315 may include a first portion of sidelink resources 320 and a dedicated resource pool 325 for sidelink control signaling. In some cases, the first portion of sidelink resources 320 may be referred to as "legacy" sidelink resources. The first portion of sidelink resources 320 may include PSSCH resources, PSCCH resources, or both. The first portion of sidelink resources 320 may include resources which may be used for transmission of SCI 335 (e.g., SCI-1, SCI-2), PSSCH data transmissions, or both. The dedicated resource pool 325 may be FDMed with the first portion of sidelink resources 320.

The dedicated resource pool 325 may be used to send sidelink control messages such as an S-DCI transmission 340 or an S-UCI transmission 350. For example, a base station 105 or a PLC may configure a set of sidelink resources for transmission of S-UCI and S-DCI, which may enable wireless devices to communicate sidelink control messages without a corresponding PSSCH transmission. In some cases, the dedicated resource pool 325 may include PSCCH resources, PSSCH resources, or both, among other types of sidelink resources.

In some cases, the dedicated resource pool 325 may span one or more subchannels 365 in the frequency domain. In some cases, the dedicated resource pool 325 may be subdivided in the time domain into time units 345 of mini-slots, symbol periods, or both. A mini-slot may include, for example, one or more symbol periods. Similarly, the dedicated resource pool 325 may be sub-divided in the frequency domain into frequency units 330 which may include resource blocks, resource elements, resource element groups, control channel elements, or any combination thereof. An S/A or a UE 115 may be scheduled in the dedicated resource pool 325 with a finer granularity in the time and frequency domain than the first portion of sidelink resources 320. The finer scheduling granularity may provide improved flexibility for sidelink control signaling.

In some cases, an S-DCI transmission 340 may provide scheduling for a wireless device. For example, a PLC of an I-IoT network may send S-DCI to schedule resources for transmission by an S/A. In some cases, the S-DCI transmission 340 may include formats or fields similar to a physical downlink control channel (PDCCH) for Uu communications. For example, the S-DCI transmission 340 may have different formats for scheduling an uplink-directed transmission or a downlink-directed transmission. Some examples of uplink-directed transmissions which may be scheduled by an S-DCI include an S-UCI transmission 350 in the dedicated resource pool 325, a PSSCH transmission from the S/A to the PLC, a PSCCH transmission from the S/A to the PLC, or any combination thereof. Some examples of downlink-directed transmissions which may be scheduled by the S-DCI may include another S-DCI transmission 340 in the dedicated resource pool 325, a PSSCH transmission from the PLC to the S/A, a PSCCH transmission from the PLC to the S/A, or any combination thereof. In some cases, the S-DCI transmission 340 may be configured according to different formats for indicating configuration information, such as an SFI, transmit power control, or pre-emption.

An S-UCI transmission 350 be used to transmit control messages such as a CSI report, HARQ feedback, inter-UE coordination messages, or any combination thereof. An S-UCI transmission may be formatted according to one of multiple different formats. In some cases, different S-UCI formats may correspond to different frequency units 330 (e.g., resource elements, resource blocks, etc.) and different time units 345 (e.g., mini-slots, symbol periods, etc.) In some cases, repetition in consecutive slots may be supported. For example, An S/A may be configured or scheduled to transmit repetitions of an S-UCI transmission in multiple consecutive slots. In some cases, an S-UCI format may be indicated by RRC signaling.

A first wireless device, such as an S/A in an I-IoT network, may receive SCI-1 335-*a* from a second wireless device, such as a PLC. The first wireless device may receive the SCI-1 335-*a* based on monitoring the set of sidelink resources 315 within the first slot 360-*a*. In some examples, the SCI-1 335-*a* may be received via a sidelink control channel (e.g., PSCCH) of the sidelink communication link between the first wireless device and the second wireless device. For example, the SCI-1 335-*a* may be communicated within a subchannel 365 of the first portion of sidelink resources 320 of the set of sidelink resources 315. The SCI-1 335-*a* may be an example of SCI-1. The SCI-1 335-*a* may include information which may be used by the first wireless device to receive, demodulate, or decode SCI-2 335-*b*, which may be an example of SCI-2.

In some cases, the first wireless device may receive SCI-2 335-*b* from the second wireless device. In some cases, the SCI-2 335-*b* may schedule an uplink-directed transmission, such as an S-UCI transmission 350, from the first wireless device to the second wireless device. In some cases, a reverse-link sidelink transmission, an uplink control information transmission, uplink data transmission, or any combination thereof, may be an example of the uplink-directed transmission. The SCI-2 335-*b* may be received via a sidelink shared channel (e.g., PSSCH) of the sidelink communication link between the first wireless device and the second wireless device. For example, the SCI-2 335-*b* may be received within a subchannel 365 of the first portion of sidelink resources 320 of the set of sidelink resources 315.

In some cases, the SCI-2 335-*b* may an example of SCI-2. In some cases, the SCI-2 335-*b* may be SCI with a second SCI format which may be different from the first SCI format for SCI-1 335-*a*. In some aspects, the S-DCI transmission 340 may be scheduled within a portion of the set of dedicated resource pool 325 by the SCI-1 335-*a* or the SCI-2 335-*b*.

In some cases, a first wireless device may be scheduled to transmit overlapping sidelink transmissions. For example, an S/A may be scheduled to transmit an S-UCI transmission 350 and a PSSCH transmission 355, and a first set of resources for the S-UCI transmission 350 in the dedicated resource pool 325 may at least partially overlap in time with a second set of resources for the PSSCH transmission 355. The PSSCH transmission 355 may be scheduled by SCI such as the SCI-1 335-*a* or the SCI-2 335-*b*, or an S-DCI transmission 340. The S-UCI transmission 350 may be scheduled by SCI such as the SCI-1 335-*a* or the SCI-2 335-*b*, or an S-DCI transmission 340. Without a rule or configuration to resolve this scheduling conflict, the first wireless device and the second wireless device may determine different outcomes, which may lead to missed or low quality signaling. Therefore, techniques described herein support resolving or preventing scheduling conflicts for a sidelink control transmission which overlaps with another sidelink transmission.

In a first example, a PLC may prevent scheduling overlapping S-UCI and PSSCH transmissions in a slot. For example, the second wireless device may be a PLC may schedule both S-UCI transmissions and PSSCH transmissions, and the PLC may refrain from scheduling S-UCI transmissions and PSSCH transmissions which at least partially overlap in the time domain.

In a second example, the first wireless device may prioritize either the S-UCI transmission 350 or the PSSCH transmission 355 and drop the other. For example, the first wireless device may drop the S-UCI transmission 350 and just transmit the PSSCH transmission 355 if the PSSCH transmission 355 is carrying information which has a higher priority than the information in the S-UCI transmission 350. Similarly, the wireless device may drop the PSSCH transmission 355 and transmit just the S-UCI transmission 350 if the S-UCI transmission 350 includes higher priority information. In some cases, a MAC layer at the first wireless device may determine which transmission to prioritize. In some cases, the traffic priority may be based on the contents of the S-UCI transmission 350, such as whether the S-UCI includes CSI or HARQ signaling or inter-UE coordination signaling.

In a third example, the S-UCI transmission 350 and the PSSCH transmission 355 may be multiplexed together. For example, the S-UCI transmission 350 may be multiplexed in the second set of resources scheduled for the PSSCH transmission 355. In some cases, different contents of an S-UCI transmission 350 may have configured locations within the second set of resources. For example, fields for HARQ feedback, a scheduling request, a first part of CSI, and a second part of CSI may have configured locations in the second set of resources, and the first wireless device may multiplex the contents into the configured locations. In some cases, the PSSCH may be rate-matched around, or according to, the S-UCI. The locations may be configured by a base station 105 or a PLC, or both and may be indicated to the first wireless device.

In some cases, the S-UCI transmission 350 and the PSSCH transmission 355 may be FDM or TDM in the second set of resources for the PSSCH transmission 355. In some cases, whether the transmissions are FDM or TDM may be based on a format for the S-UCI transmission 350. For example, the first wireless device may FDM the transmissions if the S-UCI transmission 350 has a long S-UCI format (e.g., greater than or equal to a threshold number of bits). In some cases, the second set of resources may span multiple resource elements or resource blocks in the frequency domain, and the first wireless device may FDM the transmission using a first subset of the second set of resources for the S-UCI transmission 350 and a second subset of the second set of resources for the PSSCH transmission 355.

The first wireless device may TDM the transmissions if the S-UCI transmission 350 has a short S-UCI format (e.g., fewer than the threshold number of bits). In some cases, the PSSCH transmission 355 may be at least partially punctured if the transmissions are TDM. In some cases, the first wireless device may puncture a portion of the PSSCH transmission 355 or the S-UCI transmission 350, or both. For example, the S-UCI transmission 350 may be scheduled for symbol periods 7 through 10, and the PSSCH transmission 355 may be scheduled for symbol period 1 through 8, resulting in an overlap for symbol periods 7 and 8. In a first case, the first wireless device may puncture the PSSCH transmission 355 at symbol periods 7 and 8, transmitting the PSSCH transmission 355 using symbol periods 1 through 6, and not puncture the S-UCI transmission 350. In a second case, the first wireless device may puncture symbol period 8 for the PSSCH transmission 355 and puncture symbol period 7 for the S-UCI transmission 350. In a third case, the first wireless device may puncture symbol periods 7 and 9 for the S-UCI transmission 350 and not puncture any symbol periods for the PSSCH transmission 355. In some cases, the different puncturing technique may be based on transmission content, length, or a combination thereof. Similar techniques may be implemented for overlapping S-UCI transmissions as described with reference to FIG. 4.

In a fourth example, the first wireless device may simultaneously transmit the S-UCI transmission 350 and the PSSCH transmission 355. For example, the first wireless device may transmit the S-UCI transmission 350 on the first set of resources in the dedicated resource pool 325 and transmit the PSSCH transmission 355 on the second set of resources concurrently. In some cases, the first wireless device may apply a transmit power control adjustment to the S-UCI transmission 350 and the PSSCH transmission 355.

A second wireless device receiving the S-UCI transmission 350 or the PSSCH transmission 355, or both, may determine how the first wireless device resolved the scheduling conflict. For example, the second wireless device may determine whether the first wireless device dropped one of the transmissions and is just transmitting the S-UCI transmission 350 or the PSSCH transmission 355. In some cases, the second wireless device may determine whether the first wireless device is multiplexing the S-UCI and the PSSCH together. The second wireless device may then monitor and decode the S-UCI transmission 350 or the PSSCH transmission 355, or both, according to the multiplexing. In some cases, the second wireless device may determine whether the first wireless device is transmitting both the S-UCI transmission 350 and the PSSCH transmission 355 simultaneously on the different frequency resources, and the second wireless device may consider a transmit power adjustment when decoding or monitoring for one or more of the transmissions.

In some examples, the first wireless device may send both the S-UCI transmission 350 and the PSSCH transmission 355 to a same wireless device. For example, an S/A may be scheduled to transmit both transmissions to a single PLC. In some other examples, the first wireless device may have different recipients for the S-UCI transmission 350 and the PSSCH transmission 355. The first wireless device may similarly resolve any scheduling conflicts for overlapping sidelink transmissions. Similarly, the multiple different recipients for the transmissions may also determine a scheduling conflict resolution to receive the signaling.

Figure 4:
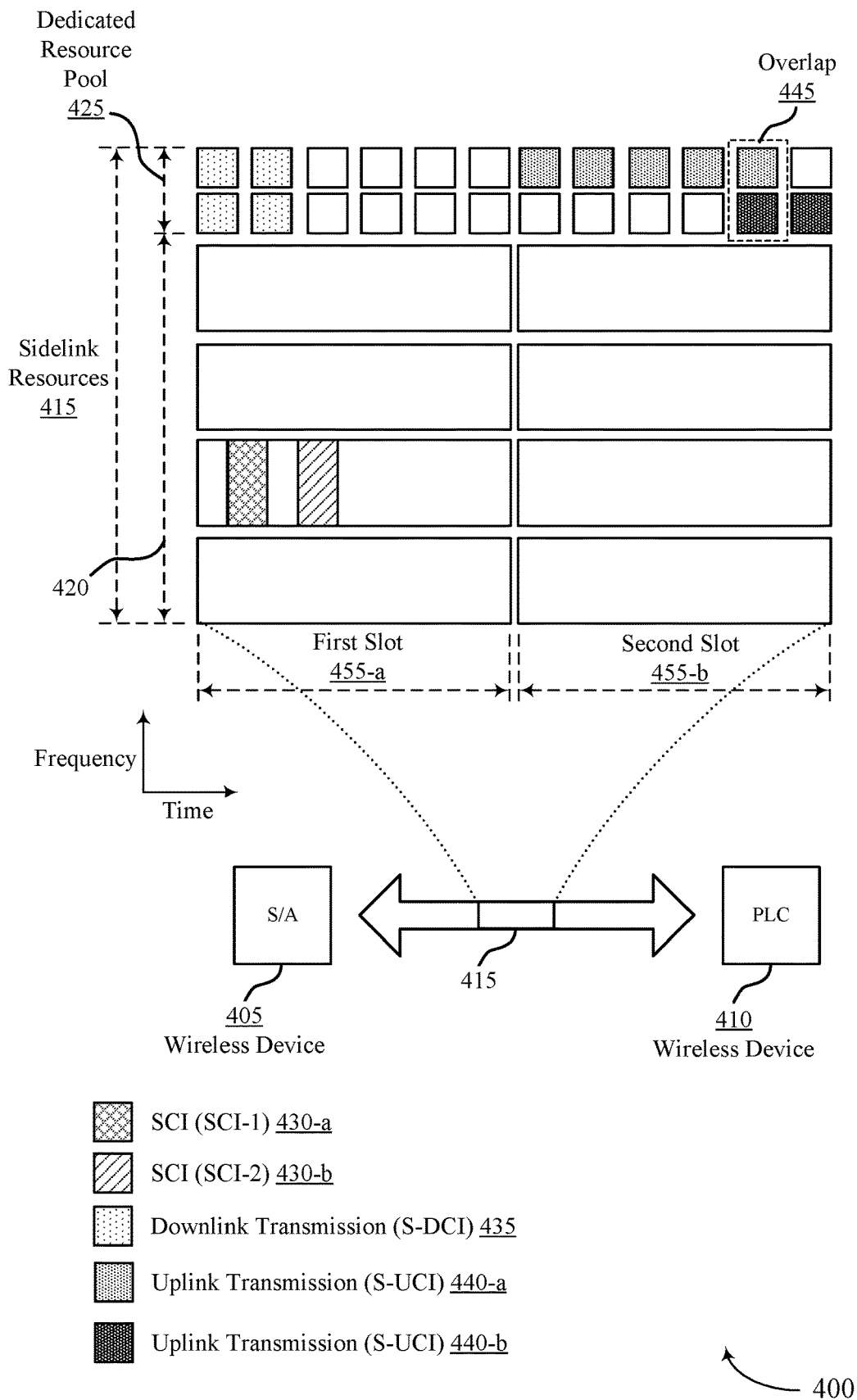
FIG. 4 illustrates an example of a resource allocation scheme that supports scheduling conflict resolution for overlapping sidelink transmissions in accordance with aspects of the present disclosure.

FIG. 4 illustrates an example of a resource allocation scheme 400 that supports scheduling conflict resolution for overlapping sidelink transmissions in accordance with aspects of the present disclosure.

The resource allocation scheme 400 illustrates a set of sidelink resources 415 which may be used for communication between devices of a wireless communications system. For example, a wireless device 405 may communicate with a wireless device 410 using the sidelink resources 415. The wireless device 405 may be an example of an S/A of an I-IoT network, and the wireless device 410 may be an example of a PLC of the I-IoT network. For example, the resource allocation scheme 400 may include sidelink resources in at least a first slot 455-a and a second slot 455-b in the time domain. The set of sidelink resources 415 may span multiple slots 455 or other transmission time intervals. The set of sidelink resources 415 may span one or more subchannels in the frequency domain.

The set of sidelink resources 415 may include a first portion of sidelink resources 420 and a dedicated resource pool 425 for sidelink control signaling. The first portion of sidelink resources 420 may include PSSCH resources and PSCCH resources and may be used for transmission of an SCI 430, such as SCI-1 430-a and SCI-2 430-b, and PSSCH data transmissions, or both. The dedicated resource pool 425 may be used to send sidelink control messages such as an S-DCI transmission 435 or an S-UCI transmission 440. The dedicated resource pool 425 may be FDMed with the first portion of sidelink resources 420 within the set of sidelink resources 415.

In some cases, a first wireless device may be scheduled to transmit overlapping sidelink transmissions. For example, an S/A may be scheduled to transmit a first S-UCI transmission 440-a and a second S-UCI transmission 440-b. Resources scheduled for the first S-UCI transmission 440-a and the second S-UCI transmission 440-b may at least partially overlap in time or frequency, or both. The first S-UCI transmission 440-a and the second S-UCI transmission 440-b may each be scheduled by an SCI 430 or an S-DCI transmission 435. In some cases, different types of S-UCI transmissions 440 may overlap in a slot. For example, the first S-UCI transmission 440-a may carry HARQ feedback and a scheduling request, and the second S-UCI transmission 440-b may carry a periodic CSI report. Techniques described herein support resolving or preventing scheduling conflicts for a sidelink control transmission which overlaps with another sidelink transmission.

In a first example, a PLC may prevent scheduling overlapping S-UCI transmissions 440 in a slot. For example, the second wireless device may be a PLC and may schedule S-UCI transmissions, and the PLC may refrain from scheduling S-UCI transmissions 440 which at least partially overlap in a slot 455.

In a second example, the first wireless device may prioritize either the first S-UCI transmission 440-a or the second S-UCI transmission 440-b and drop the other transmission. For example, the first wireless device may drop the S-UCI transmission 440-a and just transmit the S-UCI transmission 440-b if the S-UCI transmission 440-b is carrying information which has a higher priority than the information in the S-UCI transmission 440-a. Which S-UCI transmission 440 is dropped may be based on the contents of the S-UCI transmissions 440, such as whether the S-UCI transmissions 440 include CSI or HARQ signaling or inter-UE coordination signaling. In some cases, a MAC layer at the first wireless device may determine which transmission to prioritize.

In a third example, an overlapping portion 445 of one of the S-UCI transmissions may be dropped. In some cases, the first wireless device may drop overlapping symbol periods of a longer S-UCI. In the example of the resource allocation scheme 400, the first S-UCI transmission 440-a may span more symbol periods than the second S-UCI transmission 440-b. Therefore, the first wireless device may drop the overlapping portion 445 of the first S-UCI transmission 440-a. The first wireless device may then transmit part of the first S-UCI transmission 440-a and all of the second S-UCI transmission 440-b. In some cases, the first wireless device may drop one or more symbol periods from both S-UCI transmissions (e.g., if multiple symbol periods overlap). In some examples, similar techniques may be implemented for frequency overlap or time and frequency overlap. For example, the first wireless device may drop one or more resource blocks that overlap in frequency, or the first wireless device may drop one or more resource blocks and symbol periods that overlap in both time and frequency.

In some cases, two S-UCI transmissions 440 may overlap completely in time. In this example, the first wireless device may the two S-UCI transmissions 440 together. For example, an S-UCI transmission 440 with a short format may be multiplexed into an S-UCI transmission with a long format. The S-UCI transmissions 440 may be multiplexed together similar to how a physical uplink control channel (PUCCH) format 0 HARQ bit may be multiplexed into a PUCCH format 2 transmission. For example, an S-UCI transmission 440 carrying HARQ feedback may be multiplexed into an S-UCI transmission carrying a CSI report.

A second wireless device receiving one or more of the S-UCI transmissions 440 may determine how the first wireless device resolved the scheduling conflict. For example, the second wireless device may determine if the first wireless device dropped one of the S-UCI transmission 440. In some cases, the second wireless device may determine whether the first wireless device is multiplexing the S-UCI transmissions 440 together. The second wireless device may then monitor for and decode the one or more S-UCI transmissions 440 according to the multiplexing.

In some examples, the first wireless device may send both S-UCI transmissions 440 to a same wireless device. For example, an S/A may be scheduled to transmit both transmissions to a single PLC. In some other examples, the first wireless device may have different recipients for the S-UCI transmissions 440. The first wireless device may similarly resolve any scheduling conflicts for overlapping sidelink transmissions to multiple different recipients. Similarly, the multiple different recipients for the transmissions may also determine a scheduling conflict resolution to receive the signaling.

Figure 5:
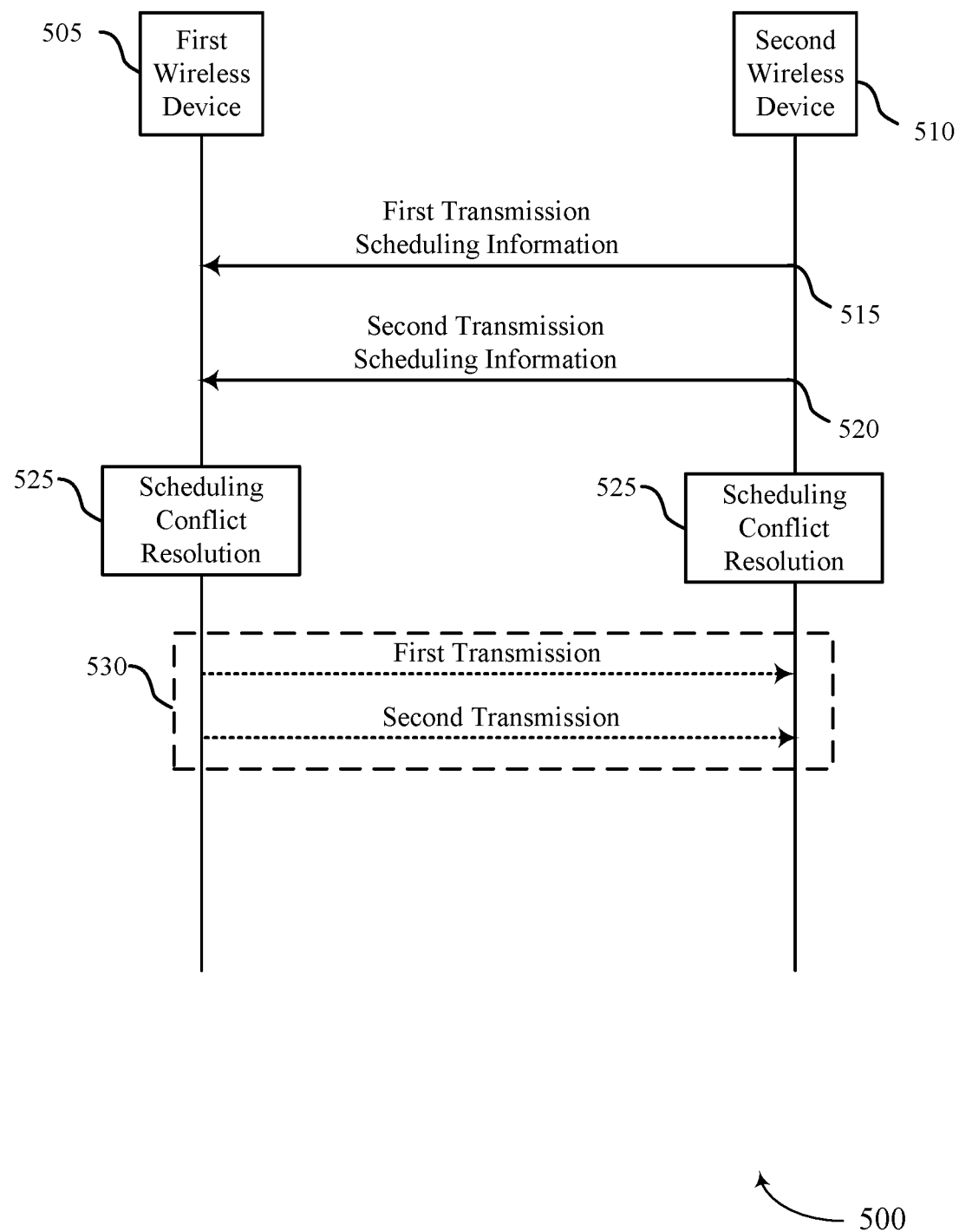
FIG. 5 illustrates an example of a process flow that supports scheduling conflict resolution for overlapping sidelink transmissions in accordance with aspects of the present disclosure.

FIG. 5 illustrates an example of a process flow 500 that supports scheduling conflict resolution for overlapping sidelink transmissions in accordance with aspects of the present disclosure. The process flow 500 may be implemented by one or more of a first wireless device 505 and a second wireless device 510b. In some cases, the first wireless device 505 and the second wireless device 510 may each be an example of a UE 115 as described herein. In some cases, the first wireless device 505 may be an example of an S/A of an I-IoT network, and the second wireless device 510 may be an example of a PLC of the I-IoT network.

At 515, the first wireless device 505 may receive, from the second wireless device 510, SCI scheduling a first transmission to be transmitted by the first wireless device 505 to the second wireless device 510 on a first set of resources in a dedicated resource pool for sidelink control signaling.

At 520, the first wireless device 505 may receive an indication that a second transmission is scheduled to be transmitted by the first wireless device 505 on a second set of resources, the second set of resources at least partially overlapping in time with the first set of resources. The indication may be received from the second wireless device 510.

At 525, the first wireless device 505 may perform a scheduling conflict resolution. For example, if the first transmission is an S-UCI transmission, and the second transmission is a PSSCH transmission, the first wireless device 505 may resolve the scheduling conflict according to one or more techniques as described with reference to FIG. 3. For example, the first wireless device 505 may determine to drop the S-UCI transmission and transmit the PSSCH transmission, or the first wireless device 505 may determine to drop the PSSCH transmission and transmit the S-UCI transmission. In some cases, the first wireless device 505 may determine to multiplex the PSSCH transmission and the S-UCI transmission.

If the first transmission is a first S-UCI transmission, and the second transmission is a second S-UCI transmission, the first wireless device 505 may resolve the scheduling conflict according to one or more techniques as described with reference to FIG. 4. For example, the first wireless device 505 may determine to drop one of the S-UCI transmissions. In some cases, the first wireless device 505 may determine to multiplex the S-UCI transmissions. In some examples, the first wireless device 505 may determine to drop or puncture a portion of one or more of the S-UCI transmissions.

At 530, the first wireless device 505 may transmit at least one of the first transmission or the second transmission in accordance with a conflict resolution rule based on the second set of resources at least partially overlapping with the first set of resources. The second wireless device 510 may similarly perform a scheduling conflict resolution at 525. The second wireless device 510 may monitor for or decode at least one of the first transmission or the second transmission based on the conflict resolution rule.

Figure 6:
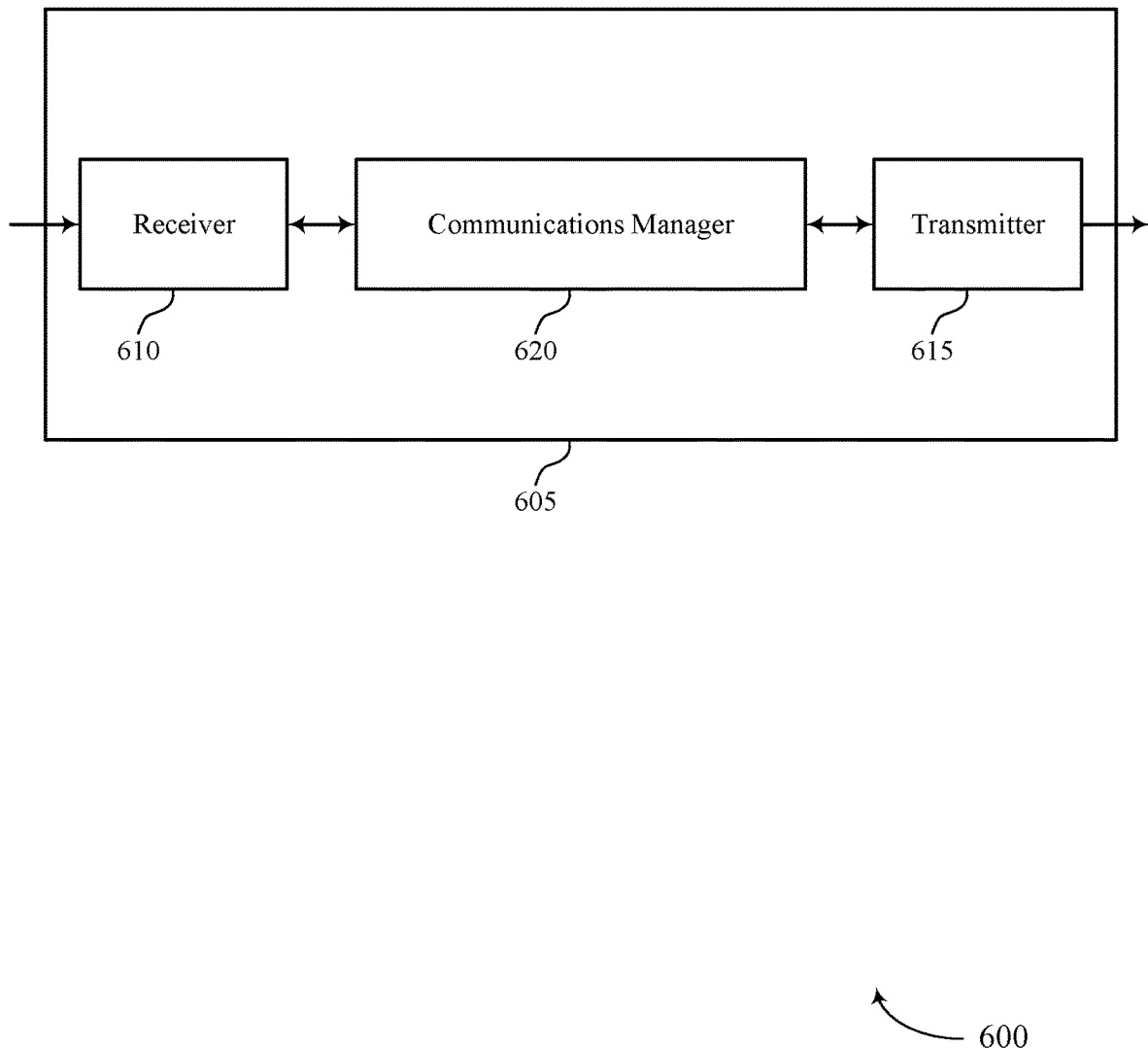
FIGS. 6 and 7 show block diagrams of devices that support scheduling conflict resolution for overlapping sidelink transmissions in accordance with aspects of the present disclosure.

FIG. 6 shows a block diagram 600 of a device 605 that supports scheduling conflict resolution for overlapping sidelink transmissions in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to scheduling conflict resolution for overlapping sidelink transmissions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to scheduling conflict resolution for overlapping sidelink transmissions). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of scheduling conflict resolution for overlapping sidelink transmissions as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first wireless device in accordance with examples as disclosed herein. For example, the communications manager 620 may be configured as or otherwise support a means for receiving, from a second wireless device and via a sidelink communication link, SCI scheduling a first transmission to be transmitted by the first wireless device to the second wireless device on a first set of resources in a dedicated resource pool for sidelink control signaling. The communications manager 620 may be configured as or otherwise support a means for receiving an indication that a second transmission is scheduled to be transmitted by the first wireless device on a second set of resources, the second set of resources at least partially overlapping in time with the first set of resources. The communications manager 620 may be configured as or otherwise support a means for transmitting at least one of the first transmission or the second transmission in accordance with a conflict resolution rule based on the second set of resources at least partially overlapping with the first set of resources.

Additionally or alternatively, the communications manager 620 may support wireless communications at a second wireless device in accordance with examples as disclosed herein. For example, the communications manager 620 may be configured as or otherwise support a means for transmitting, to a first wireless device and via a sidelink communication link, SCI scheduling a first transmission from the first wireless device to the second wireless device on a first set of resources in a dedicated resource pool for sidelink control signaling. The communications manager 620 may be configured as or otherwise support a means for transmitting an indication that a second transmission is scheduled to be transmitted by the first wireless device on a second set of resources to the second wireless device, the second set of resources at least partially overlapping in time with the first set of resources. The communications manager 620 may be configured as or otherwise support a means for receiving at least one of the first transmission or the second transmission in accordance with a conflict resolution rule based on the second set of resources at least partially overlapping with the first set of resources.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for decreasing latency for control signaling or increasing sidelink resource utilization. For example, by using a dedicated resource pool for sidelink control messages, a UE 115, such as an S/A, may be able to send sidelink control signaling without waiting for a data transmission or without using an entire slot just for the control signaling. Additionally, but implementing scheduling conflict resolution rules, an S/A and a PLC may ensure reliable signaling using the dedicated resource pool. For example, by operating according to the scheduling conflict resolution rules, both the S/A and the PLC may determine how to efficiently resolve colliding sidelink scheduling.

Figure 7:
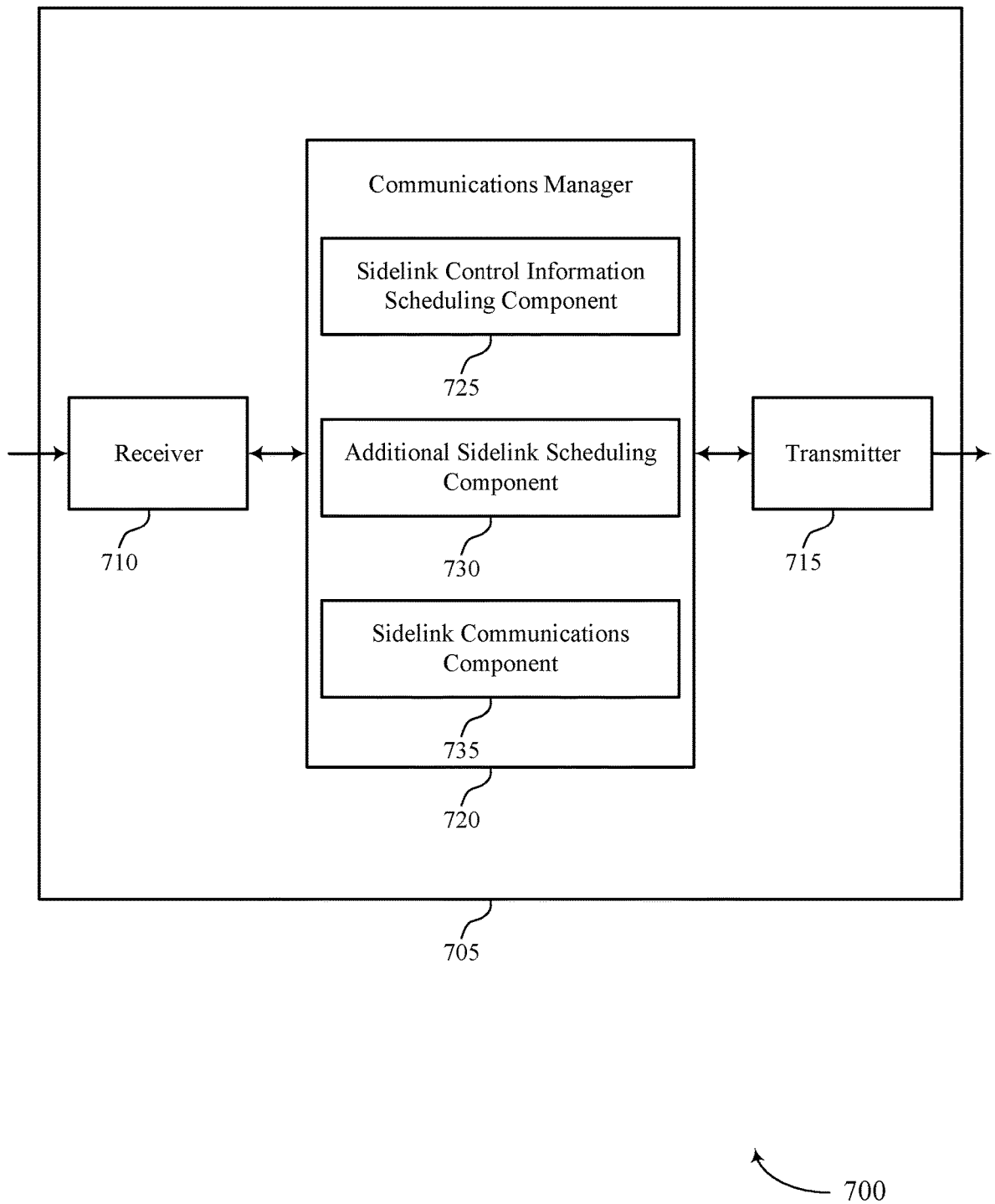

FIG. 7 shows a block diagram 700 of a device 705 that supports scheduling conflict resolution for overlapping sidelink transmissions in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to scheduling conflict resolution for overlapping sidelink transmissions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to scheduling conflict resolution for overlapping sidelink transmissions). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of scheduling conflict resolution for overlapping sidelink transmissions as described herein. For example, the communications manager 720 may include a sidelink control information scheduling component 725, an additional sidelink scheduling component 730, a sidelink communications component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first wireless device in accordance with examples as disclosed herein. The sidelink control information scheduling component 725 may be configured as or otherwise support a means for receiving, from a second wireless device and via a sidelink communication link, SCI scheduling a first transmission to be transmitted by the first wireless device to the second wireless device on a first set of resources in a dedicated resource pool for sidelink control signaling. The additional sidelink scheduling component 730 may be configured as or otherwise support a means for receiving an indication that a second transmission is scheduled to be transmitted by the first wireless device on a second set of resources, the second set of resources at least partially overlapping in time with the first set of resources. The sidelink communications component 735 may be configured as or otherwise support a means for transmitting at least one of the first transmission or the second transmission in accordance with a conflict resolution rule based on the second set of resources at least partially overlapping with the first set of resources.

Additionally or alternatively, the communications manager 720 may support wireless communications at a second wireless device in accordance with examples as disclosed herein. The sidelink control information scheduling component 725 may be configured as or otherwise support a means for transmitting, to a first wireless device and via a sidelink communication link, SCI scheduling a first transmission from the first wireless device to the second wireless device on a first set of resources in a dedicated resource pool for sidelink control signaling. The additional sidelink scheduling component 730 may be configured as or otherwise support a means for transmitting an indication that a second transmission is scheduled to be transmitted by the first wireless device on a second set of resources to the second wireless device, the second set of resources at least partially overlapping in time with the first set of resources. The sidelink communications component 735 may be configured as or otherwise support a means for receiving at least one of the first transmission or the second transmission in accordance with a conflict resolution rule based on the second set of resources at least partially overlapping with the first set of resources.

Figure 8:
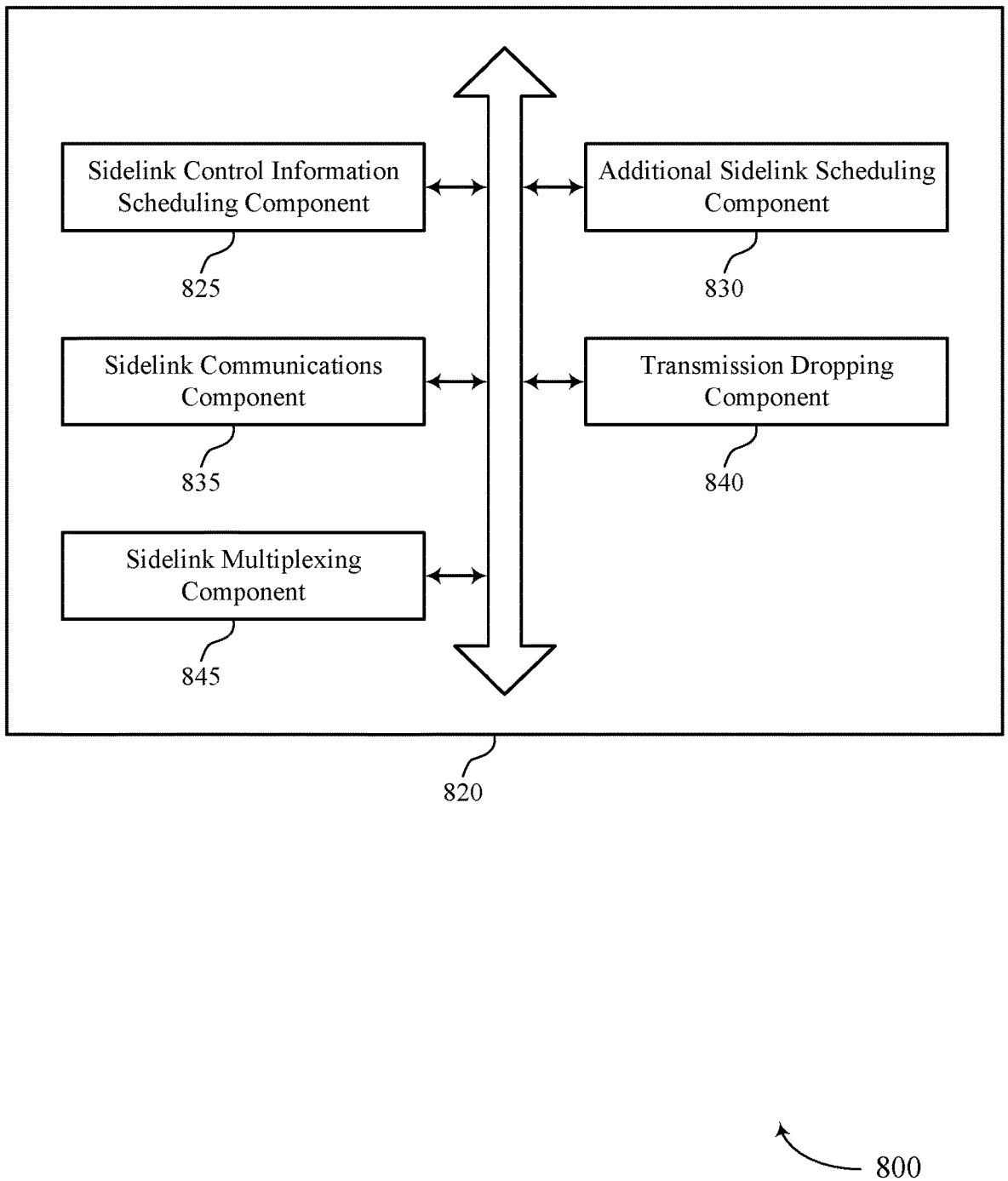
FIG. 8 shows a block diagram of a communications manager that supports scheduling conflict resolution for overlapping sidelink transmissions in accordance with aspects of the present disclosure.

FIG. 8 shows a block diagram 800 of a communications manager 820 that supports scheduling conflict resolution for overlapping sidelink transmissions in accordance with aspects of the present disclosure. The communications manager 820 may be an example of aspects of a communications manager 620, a communications manager 720, or both, as described herein. The communications manager 820, or various components thereof, may be an example of means for performing various aspects of scheduling conflict resolution for overlapping sidelink transmissions as described herein. For example, the communications manager 820 may include a sidelink control information scheduling component 825, an additional sidelink scheduling component 830, a sidelink communications component 835, a transmission dropping component 840, a sidelink multiplexing component 845, or any combination thereof. Each of these components may communicate, directly or indirectly, with one another (e.g., via one or more buses).

The communications manager 820 may support wireless communications at a first wireless device in accordance with examples as disclosed herein. The sidelink control information scheduling component 825 may be configured as or otherwise support a means for receiving, from a second wireless device and via a sidelink communication link, SCI scheduling a first transmission to be transmitted by the first wireless device to the second wireless device on a first set of resources in a dedicated resource pool for sidelink control signaling. The additional sidelink scheduling component 830 may be configured as or otherwise support a means for receiving an indication that a second transmission is scheduled to be transmitted by the first wireless device on a second set of resources, the second set of resources at least partially overlapping in time with the first set of resources. The sidelink communications component 835 may be configured as or otherwise support a means for transmitting at least one of the first transmission or the second transmission in accordance with a conflict resolution rule based on the second set of resources at least partially overlapping with the first set of resources.

In some examples, the sidelink communications component 835 may be configured as or otherwise support a means for transmitting the first transmission on the first set of resources. In some examples, the transmission dropping component 840 may be configured as or otherwise support a means for dropping the second transmission on the second set of resources in accordance with the conflict resolution rule based at last in part on a higher priority of a content of the first transmission.

In some examples, the sidelink communications component 835 may be configured as or otherwise support a means for transmitting the second transmission on the second set of resources. In some examples, the transmission dropping component 840 may be configured as or otherwise support a means for dropping the first transmission on the first set of resources in accordance with the conflict resolution rule based at last in part on a lower priority of a content of the first transmission.

In some examples, the sidelink multiplexing component 845 may be configured as or otherwise support a means for multiplexing the first transmission with the second transmission on the second set of resources, where the second transmission is rate matched according to the first transmission. In some examples, a content of the first transmission is transmitted on a subset of the second set of resources in accordance with the conflict resolution rule. In some examples, a HARQ field, a scheduling request, a first part of CSI, a second part of CSI, or any combination thereof, each correspond to a respective configured portion of the subset of the second set of resources.

In some examples, the sidelink multiplexing component 845 may be configured as or otherwise support a means for FDMing or TDMing the first transmission with the second transmission on the second set of resources based on a format of the first transmission. In some examples, the first transmission is FDMed with the second transmission based on the format of the first transmission being a long format. In some examples, the first transmission is TDMed with the second transmission based on the format of the first transmission being a short format. In some examples, the sidelink multiplexing component 845 may be configured as or otherwise support a means for puncturing at least a portion of the first transmission or the second transmission.

In some examples, the sidelink communications component 835 may be configured as or otherwise support a means for transmitting, with at least partial time domain overlap, the first transmission on the first set of resources and the second transmission on the second set of resources.

In some examples, the transmission dropping component 840 may be configured as or otherwise support a means for dropping one or more resource blocks of the first transmission that overlap in time or frequency, or both, with the second transmission. In some examples, the sidelink communications component 835 may be configured as or otherwise support a means for transmitting a remaining portion of the first transmission on a portion of the first set of resources. In some examples, the sidelink communications component 835 may be configured as or otherwise support a means for transmitting the second transmission on the second set of resources.

In some examples, the sidelink multiplexing component 845 may be configured as or otherwise support a means for multiplexing the second transmission and the first transmission on the first set of resources or the second set of resources based on the first transmission and the second transmission completely overlapping in time.

In some examples, the first transmission is multiplexed in the second transmission based on the first transmission having a short format and the second transmission having a long format, or the second transmission is multiplexed in the first transmission based on the first transmission having the long format and the second transmission having the short format.

In some examples, the first transmission is a sidelink uplink control information transmission, and the second transmission is a second shared channel transmission.

In some examples, the first transmission is a first sidelink uplink control information transmission, and the second transmission is a second sidelink uplink control information transmission.

Additionally or alternatively, the communications manager 820 may support wireless communications at a second wireless device in accordance with examples as disclosed herein. In some examples, the sidelink control information scheduling component 825 may be configured as or otherwise support a means for transmitting, to a first wireless device and via a sidelink communication link, SCI scheduling a first transmission from the first wireless device to the second wireless device on a first set of resources in a dedicated resource pool for sidelink control signaling. In some examples, the additional sidelink scheduling component 830 may be configured as or otherwise support a means for transmitting an indication that a second transmission is scheduled to be transmitted by the first wireless device on a second set of resources to the second wireless device, the second set of resources at least partially overlapping in time with the first set of resources. In some examples, the sidelink communications component 835 may be configured as or otherwise support a means for receiving at least one of the first transmission or the second transmission in accordance with a conflict resolution rule based on the second set of resources at least partially overlapping with the first set of resources.

In some examples, the sidelink communications component 835 may be configured as or otherwise support a means for obtaining the first transmission and the second transmission on the second set of resources, where the second transmission is rate matched according to the first transmission.

In some examples, a content of the first transmission is received on a subset of the second set of resources in accordance with the conflict resolution rule.

In some examples, a hybrid automatic repeat request field, a scheduling request, a first part of CSI, a second part of CSI, or any combination thereof, each correspond to a respective configured portion of the subset of the second set of resources.

In some examples, the sidelink communications component 835 may be configured as or otherwise support a means for receiving the first transmission and the second transmission FDMed or TDMed together on the second set of resources based on a format of the first transmission. In some examples, the first transmission is FDMed with the second transmission based on the format of the first transmission being a long format. In some examples, the first transmission is TDMed with the second transmission based on the format of the first transmission being a short format. In some examples, the first transmission at least partially punctures the second transmission on the second set of resources.

In some examples, the sidelink communications component 835 may be configured as or otherwise support a means for receiving, at least partially concurrently, the first transmission on the first set of resources and the second transmission on the second set of resources.

In some examples, the sidelink communications component 835 may be configured as or otherwise support a means for determining one or more resource blocks of the second transmission that overlap in time or frequency, or both, with the first transmission have been dropped. In some examples, the sidelink communications component 835 may be configured as or otherwise support a means for receiving the first transmission on the first set of resources. In some examples, the sidelink communications component 835 may be configured as or otherwise support a means for receiving a remaining portion of the second transmission on a portion of the second set of resources based on the one or more resource blocks of the second transmission being dropped.

In some examples, the sidelink communications component 835 may be configured as or otherwise support a means for receiving the second transmission and the first transmission multiplexed together on the first set of resources or the second set of resources based on the first transmission and the second transmission completely overlapping in time.

Figure 9:
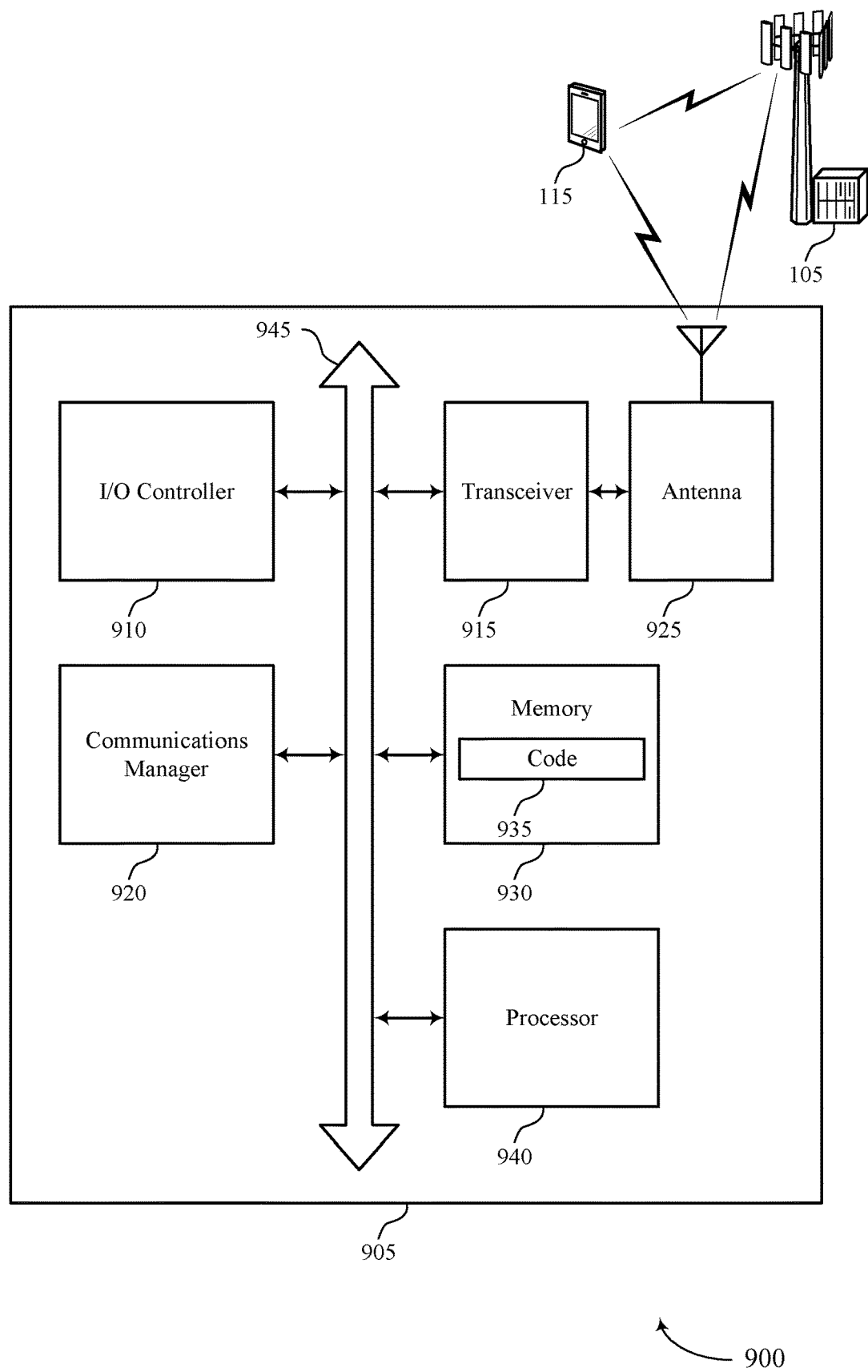
FIG. 9 shows a diagram of a system including a device that supports scheduling conflict resolution for overlapping sidelink transmissions in accordance with aspects of the present disclosure.

FIG. 9 shows a diagram of a system 900 including a device 905 that supports scheduling conflict resolution for overlapping sidelink transmissions in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting scheduling conflict resolution for overlapping sidelink transmissions). For example, the device 905 or a component of the device 905 may include a processor 940 and memory 930 coupled to the processor 940, the processor 940 and memory 930 configured to perform various functions described herein.

The communications manager 920 may support wireless communications at a first wireless device in accordance with examples as disclosed herein. For example, the communications manager 920 may be configured as or otherwise support a means for receiving, from a second wireless device and via a sidelink communication link, SCI scheduling a first transmission to be transmitted by the first wireless device to the second wireless device on a first set of resources in a dedicated resource pool for sidelink control signaling. The communications manager 920 may be configured as or otherwise support a means for receiving an indication that a second transmission is scheduled to be transmitted by the first wireless device on a second set of resources, the second set of resources at least partially overlapping in time with the first set of resources. The communications manager 920 may be configured as or otherwise support a means for transmitting at least one of the first transmission or the second transmission in accordance with a conflict resolution rule based on the second set of resources at least partially overlapping with the first set of resources.

Additionally or alternatively, the communications manager 920 may support wireless communications at a second wireless device in accordance with examples as disclosed herein. For example, the communications manager 920 may be configured as or otherwise support a means for transmitting, to a first wireless device and via a sidelink communication link, SCI scheduling a first transmission from the first wireless device to the second wireless device on a first set of resources in a dedicated resource pool for sidelink control signaling. The communications manager 920 may be configured as or otherwise support a means for transmitting an indication that a second transmission is scheduled to be transmitted by the first wireless device on a second set of resources to the second wireless device, the second set of resources at least partially overlapping in time with the first set of resources. The communications manager 920 may be configured as or otherwise support a means for receiving at least one of the first transmission or the second transmission in accordance with a conflict resolution rule based on the second set of resources at least partially overlapping with the first set of resources.

By including or configuring the communications manager 920 in accordance with examples as described herein, the device 905 may support techniques for decreasing latency for control signaling or increasing sidelink resource utilization. For example, by using a dedicated resource pool for sidelink control messages, a UE 115, such as an S/A, may be able to send sidelink control signaling without waiting for a data transmission or without using an entire slot just for the control signaling. The S/A and a PLC may implement techniques to resolve scheduling conflicts for scheduled transmissions on the dedicated resource pool. For example, the S/A and the PLC may identify whether the S/A drops one of two overlapping transmissions or multiplexes the overlapping transmissions together (e.g., via TDM techniques or FDM techniques). This may enable the S/A to efficiently communicate one or both of the overlapping transmissions and enable the PLC to receive and coherently decide the one or more overlapping transmissions.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of scheduling conflict resolution for overlapping sidelink transmissions as described herein, or the processor 940 and the memory 930 may be otherwise configured to perform or support such operations.

Figure 10:
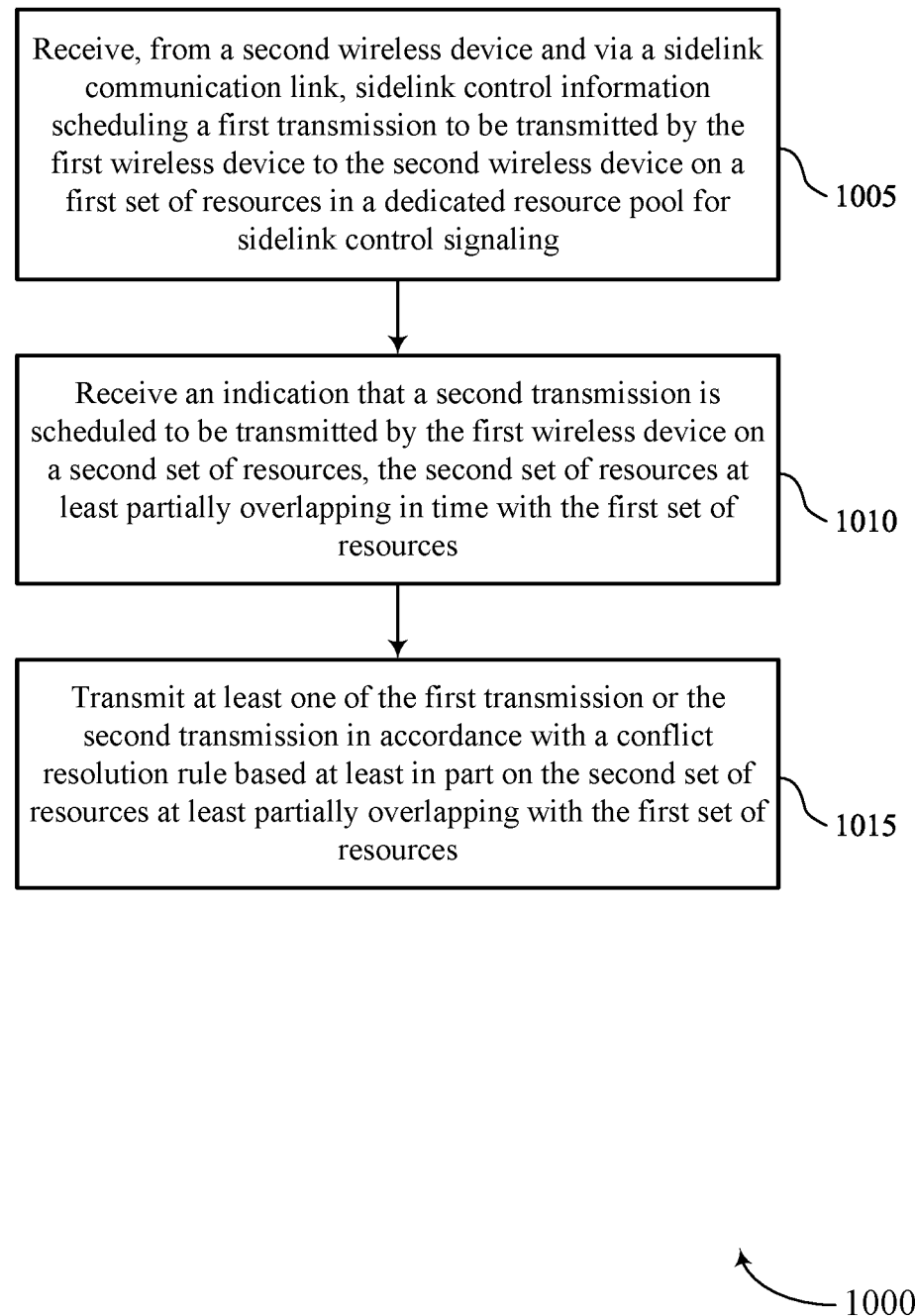
FIGS. 10 through 14 show flowcharts illustrating methods that support scheduling conflict resolution for overlapping sidelink transmissions in accordance with aspects of the present disclosure.

FIG. 10 shows a flowchart illustrating a method 1000 that supports scheduling conflict resolution for overlapping sidelink transmissions in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include receiving, from a second wireless device and via a sidelink communication link, sidelink control information scheduling a first transmission to be transmitted by the first wireless device to the second wireless device on a first set of resources in a dedicated resource pool for sidelink control signaling. The operations of 1005 may be performed in accordance with examples as disclosed herein. In some examples, aspects of the operations of 1005 may be performed by a sidelink control information scheduling component 825 as described with reference to FIG. 8.

At 1010, the method may include receiving an indication that a second transmission is scheduled to be transmitted by the first wireless device on a second set of resources, the second set of resources at least partially overlapping in time with the first set of resources. The operations of 1010 may be performed in accordance with examples as disclosed herein. In some examples, aspects of the operations of 1010 may be performed by an additional sidelink scheduling component 830 as described with reference to FIG. 8.

At 1015, the method may include transmitting at least one of the first transmission or the second transmission in accordance with a conflict resolution rule based on the second set of resources at least partially overlapping with the first set of resources. The operations of 1015 may be performed in accordance with examples as disclosed herein. In some examples, aspects of the operations of 1015 may be performed by a sidelink communications component 835 as described with reference to FIG. 8.

Figure 11:
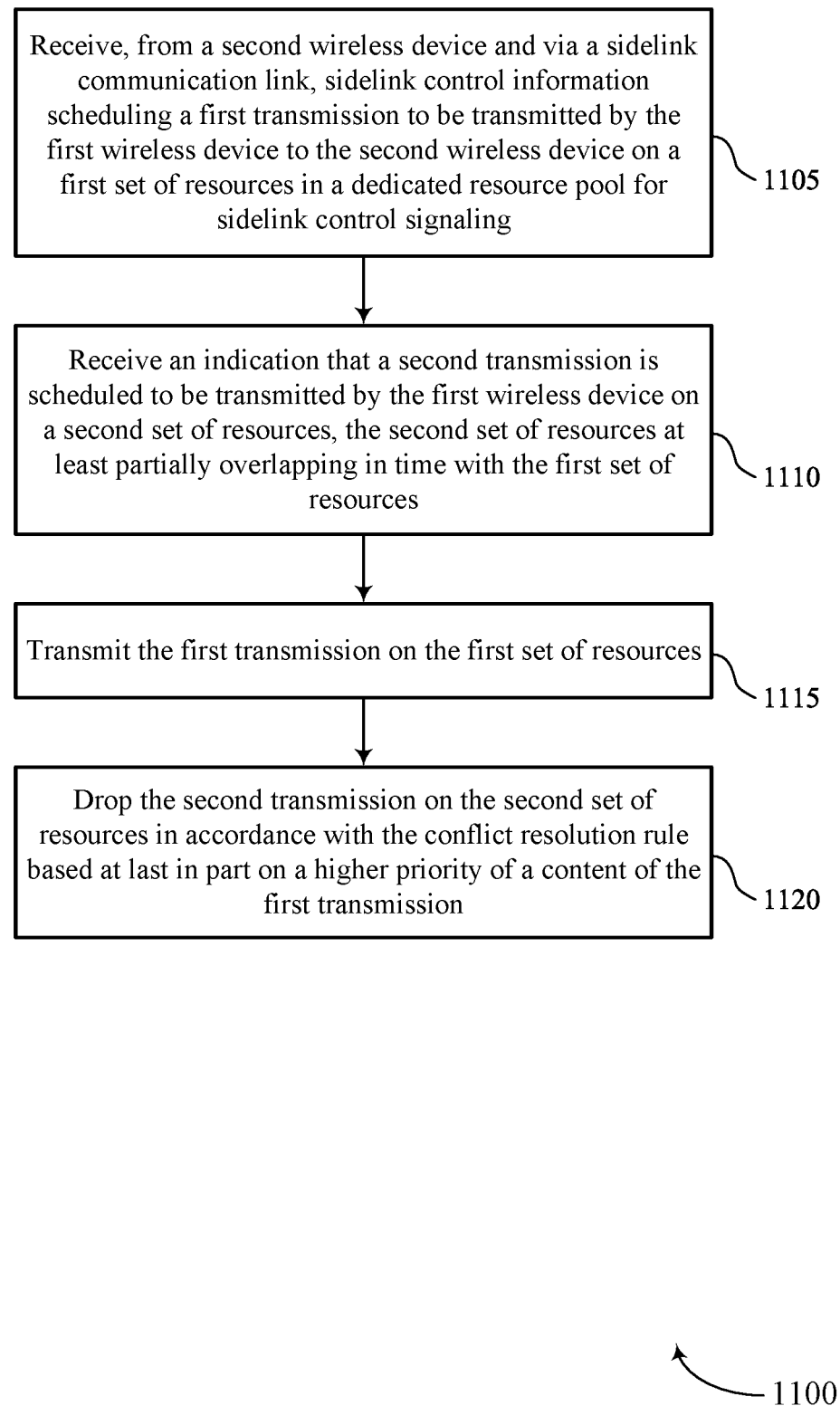

FIG. 11 shows a flowchart illustrating a method 1100 that supports scheduling conflict resolution for overlapping sidelink transmissions in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include receiving, from a second wireless device and via a sidelink communication link, sidelink control information scheduling a first transmission to be transmitted by the first wireless device to the second wireless device on a first set of resources in a dedicated resource pool for sidelink control signaling. The operations of 1105 may be performed in accordance with examples as disclosed herein. In some examples, aspects of the operations of 1105 may be performed by a sidelink control information scheduling component 825 as described with reference to FIG. 8.

At 1110, the method may include receiving an indication that a second transmission is scheduled to be transmitted by the first wireless device on a second set of resources, the second set of resources at least partially overlapping in time with the first set of resources. The operations of 1110 may be performed in accordance with examples as disclosed herein. In some examples, aspects of the operations of 1110 may be performed by an additional sidelink scheduling component 830 as described with reference to FIG. 8.

At 1115, the method may include transmitting the first transmission on the first set of resources. The operations of 1115 may be performed in accordance with examples as disclosed herein. In some examples, aspects of the operations of 1115 may be performed by a sidelink communications component 835 as described with reference to FIG. 8.

At 1120, the method may include dropping the second transmission on the second set of resources in accordance with the conflict resolution rule based at last in part on a higher priority of a content of the first transmission. The operations of 1120 may be performed in accordance with examples as disclosed herein. In some examples, aspects of the operations of 1120 may be performed by a transmission dropping component 840 as described with reference to FIG. 8.

Figure 12:
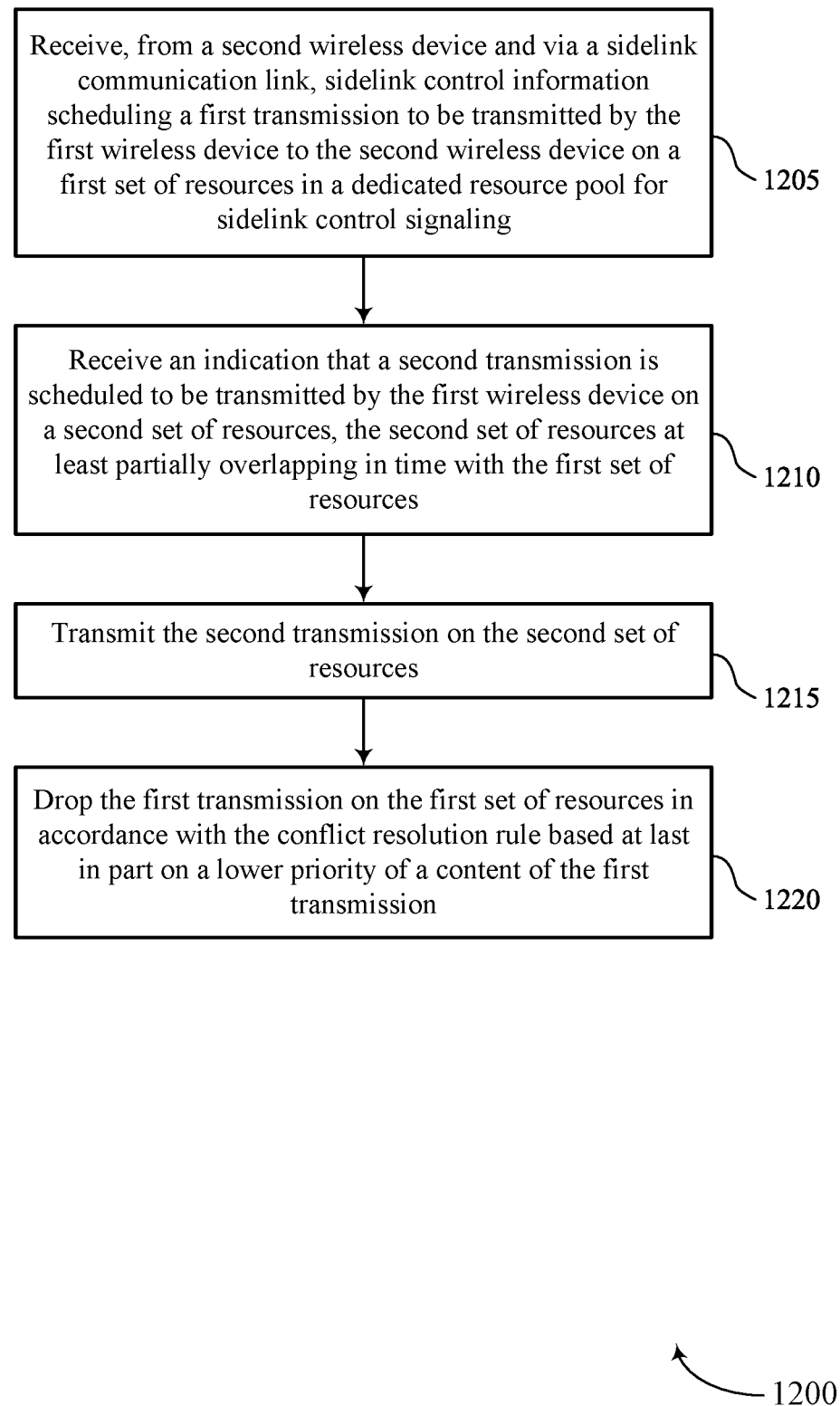

FIG. 12 shows a flowchart illustrating a method 1200 that supports scheduling conflict resolution for overlapping sidelink transmissions in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include receiving, from a second wireless device and via a sidelink communication link, sidelink control information scheduling a first transmission to be transmitted by the first wireless device to the second wireless device on a first set of resources in a dedicated resource pool for sidelink control signaling. The operations of 1205 may be performed in accordance with examples as disclosed herein. In some examples, aspects of the operations of 1205 may be performed by a sidelink control information scheduling component 825 as described with reference to FIG. 8.

At 1210, the method may include receiving an indication that a second transmission is scheduled to be transmitted by the first wireless device on a second set of resources, the second set of resources at least partially overlapping in time with the first set of resources. The operations of 1210 may be performed in accordance with examples as disclosed herein. In some examples, aspects of the operations of 1210 may be performed by an additional sidelink scheduling component 830 as described with reference to FIG. 8.

At 1215, the method may include transmitting the second transmission on the second set of resources. The operations of 1215 may be performed in accordance with examples as disclosed herein. In some examples, aspects of the operations of 1215 may be performed by a sidelink communications component 835 as described with reference to FIG. 8.

At 1220, the method may include dropping the first transmission on the first set of resources in accordance with the conflict resolution rule based at last in part on a lower priority of a content of the first transmission. The operations of 1220 may be performed in accordance with examples as disclosed herein. In some examples, aspects of the operations of 1220 may be performed by a transmission dropping component 840 as described with reference to FIG. 8.

Figure 13:
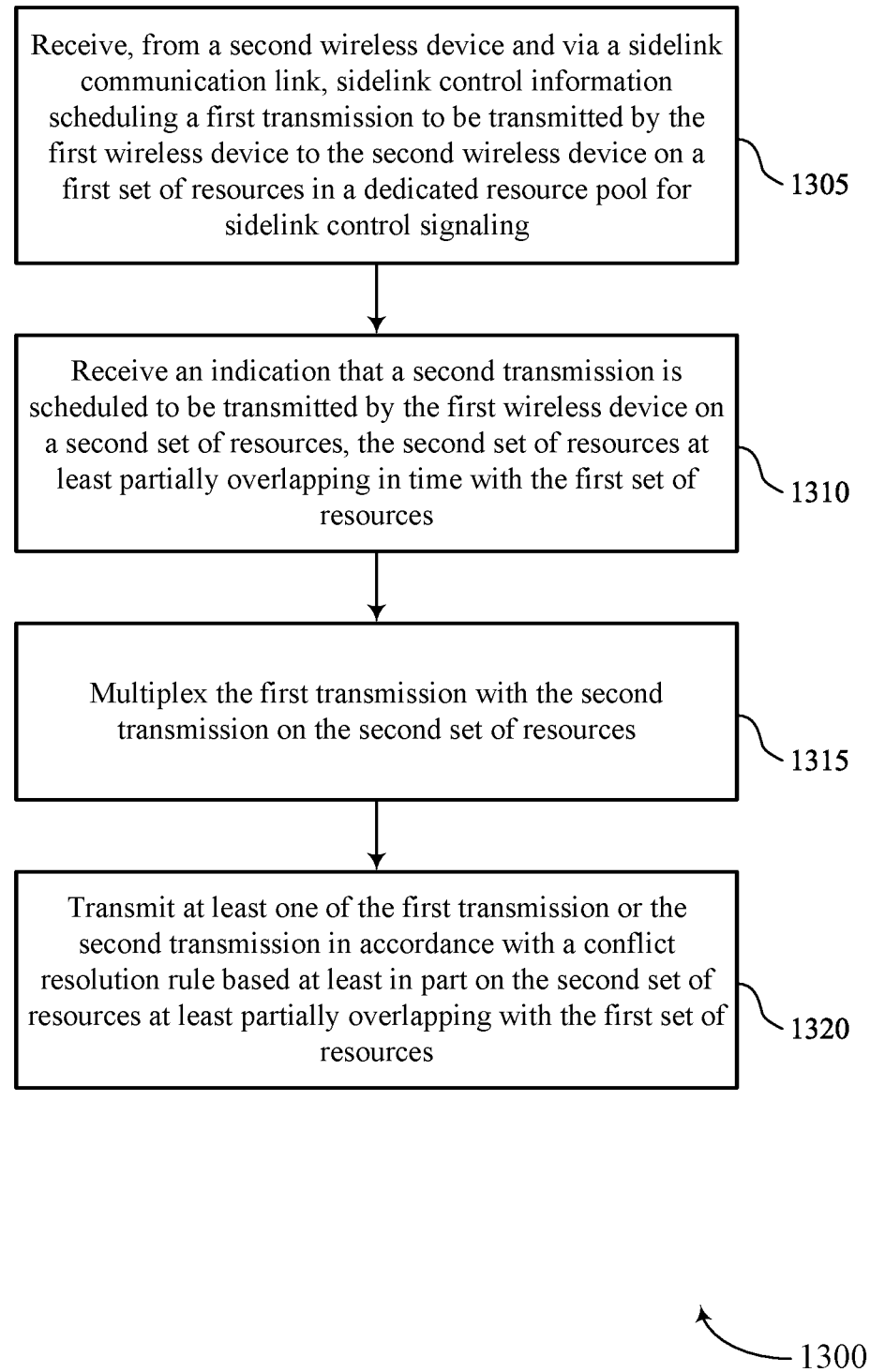

FIG. 13 shows a flowchart illustrating a method 1300 that supports scheduling conflict resolution for overlapping sidelink transmissions in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include receiving, from a second wireless device and via a sidelink communication link, sidelink control information scheduling a first transmission to be transmitted by the first wireless device to the second wireless device on a first set of resources in a dedicated resource pool for sidelink control signaling. The operations of 1305 may be performed in accordance with examples as disclosed herein. In some examples, aspects of the operations of 1305 may be performed by a sidelink control information scheduling component 825 as described with reference to FIG. 8.

At 1310, the method may include receiving an indication that a second transmission is scheduled to be transmitted by the first wireless device on a second set of resources, the second set of resources at least partially overlapping in time with the first set of resources. The operations of 1310 may be performed in accordance with examples as disclosed herein. In some examples, aspects of the operations of 1310 may be performed by an additional sidelink scheduling component 830 as described with reference to FIG. 8.

At 1315, the method may include multiplexing the first transmission with the second transmission on the second set of resources, where the second transmission is rate matched according to the first transmission. The operations of 1315 may be performed in accordance with examples as disclosed herein. In some examples, aspects of the operations of 1315 may be performed by a sidelink multiplexing component 845 as described with reference to FIG. 8.

At 1320, the method may include transmitting at least one of the first transmission or the second transmission in accordance with a conflict resolution rule based on the second set of resources at least partially overlapping with the first set of resources. The operations of 1320 may be performed in accordance with examples as disclosed herein. In some examples, aspects of the operations of 1320 may be performed by a sidelink communications component 835 as described with reference to FIG. 8.

Figure 14:
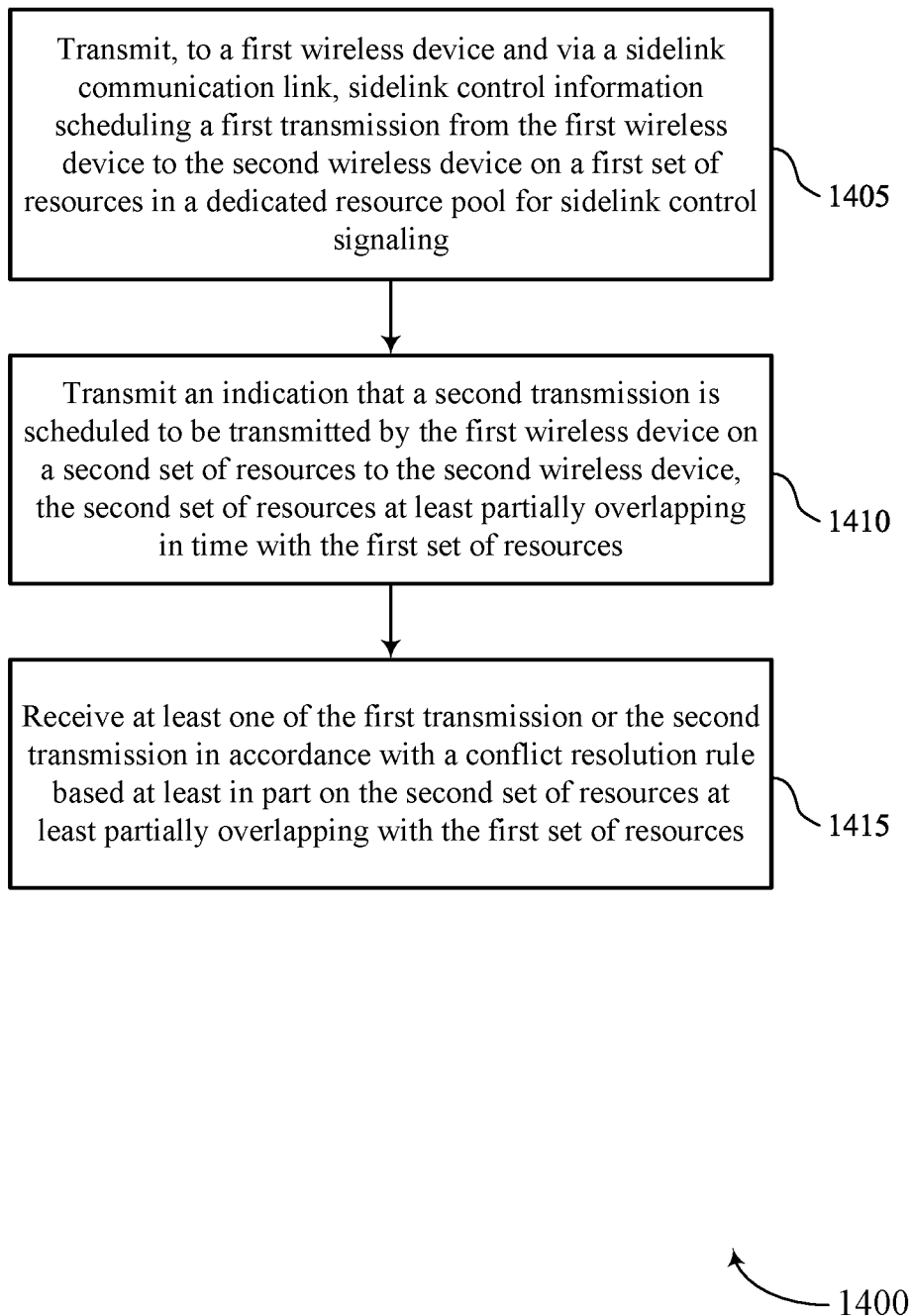

FIG. 14 shows a flowchart illustrating a method 1400 that supports scheduling conflict resolution for overlapping sidelink transmissions in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include transmitting, to a first wireless device and via a sidelink communication link, sidelink control information scheduling a first transmission from the first wireless device to the second wireless device on a first set of resources in a dedicated resource pool for sidelink control signaling. The operations of 1405 may be performed in accordance with examples as disclosed herein. In some examples, aspects of the operations of 1405 may be performed by a sidelink control information scheduling component 825 as described with reference to FIG. 8.

At 1410, the method may include transmitting an indication that a second transmission is scheduled to be transmitted by the first wireless device on a second set of resources to the second wireless device, the second set of resources at least partially overlapping in time with the first set of resources. The operations of 1410 may be performed in accordance with examples as disclosed herein. In some examples, aspects of the operations of 1410 may be performed by an additional sidelink scheduling component 830 as described with reference to FIG. 8.

At 1415, the method may include receiving at least one of the first transmission or the second transmission in accordance with a conflict resolution rule based on the second set of resources at least partially overlapping with the first set of resources. The operations of 1415 may be performed in accordance with examples as disclosed herein. In some examples, aspects of the operations of 1415 may be performed by a sidelink communications component 835 as described with reference to FIG. 8.

The following provides an overview of aspects of the present disclosure:

Aspect 1: A method for wireless communications at a first wireless device, comprising: receiving, from a second wireless device and via a sidelink communication link, sidelink control information scheduling a first transmission to be transmitted by the first wireless device to the second wireless device on a first set of resources in a dedicated resource pool for sidelink control signaling; receiving an indication that a second transmission is scheduled to be transmitted by the first wireless device on a second set of resources, the second set of resources at least partially overlapping in time with the first set of resources; and transmitting at least one of the first transmission or the second transmission in accordance with a conflict resolution rule based at least in part on the second set of resources at least partially overlapping with the first set of resources.

Aspect 2: The method of aspect 1, the transmitting of at least one of the first transmission or the second transmission comprising: transmitting the first transmission on the first set of resources; and dropping the second transmission on the second set of resources in accordance with the conflict resolution rule based at last in part on a higher priority of a content of the first transmission.

Aspect 3: The method of aspect 1, the transmitting of at least one of the first transmission or the second transmission comprising: transmitting the second transmission on the second set of resources; and dropping the first transmission on the first set of resources in accordance with the conflict resolution rule based at last in part on a lower priority of a content of the first transmission.

Aspect 4: The method of aspect 1, the transmitting of at least one of the first transmission or the second transmission comprising: multiplexing the first transmission with the second transmission on the second set of resources, wherein the second transmission is rate matched according to the first transmission.

Aspect 5: The method of aspect 4, wherein a content of the first transmission is transmitted on a subset of the second set of resources in accordance with the conflict resolution rule.

Aspect 6: The method of aspect 5, wherein a hybrid automatic repeat request field, a scheduling request, a first part of channel state information, a second part of channel state information, or any combination thereof, each correspond to a respective configured portion of the subset of the second set of resources.

Aspect 7: The method of any of aspects 4 through 6, the transmitting of at least one of the first transmission or the second transmission comprising: frequency division multiplexing or time division multiplexing the first transmission with the second transmission on the second set of resources based at least in part on a format of the first transmission.

Aspect 8: The method of aspect 7, wherein the first transmission is frequency division multiplexed with the second transmission based at least in part on the format of the first transmission being a long format.

Aspect 9: The method of any of aspects 7 through 8, wherein the first transmission is time division multiplexed with the second transmission based at least in part on the format of the first transmission being a short format.

Aspect 10: The method of aspect 9, further comprising: puncturing at least a portion of the first transmission or the second transmission.

Aspect 11: The method of aspect 1, the transmitting of at least one of the first transmission or the second transmission comprising: transmitting, with at least partial time domain overlap, the first transmission on the first set of resources and the second transmission on the second set of resources.

Aspect 12: The method of aspect 1, the transmitting of at least one of the first transmission or the second transmission comprising: dropping one or more resource blocks of the first transmission that overlap in time or frequency, or both, with the second transmission; transmitting a remaining portion of the first transmission on a portion of the first set of resources; and transmitting the second transmission on the second set of resources.

Aspect 13: The method of aspect 1, the transmitting of at least one of the first transmission or the second transmission comprising: multiplexing the second transmission and the first transmission on the first set of resources or the second set of resources based at least in part on the first transmission and the second transmission completely overlapping in time.

Aspect 14: The method of aspect 13, wherein the first transmission is multiplexed in the second transmission based at least in part on the first transmission having a short format and the second transmission having a long format, or the second transmission is multiplexed in the first transmission based at least in part on the first transmission having the long format and the second transmission having the short format.

Aspect 15: The method of any of aspects 1 through 14, wherein the first transmission is a sidelink uplink control information transmission, and the second transmission is a second shared channel transmission.

Aspect 16: The method of any of aspects 1 through 15, wherein the first transmission is a first sidelink uplink control information transmission, and the second transmission is a second sidelink uplink control information transmission.

Aspect 17: A method for wireless communications at a second wireless device, comprising: transmitting, to a first wireless device and via a sidelink communication link, sidelink control information scheduling a first transmission from the first wireless device to the second wireless device on a first set of resources in a dedicated resource pool for sidelink control signaling; transmitting an indication that a second transmission is scheduled to be transmitted by the first wireless device on a second set of resources to the second wireless device, the second set of resources at least partially overlapping in time with the first set of resources; and receiving at least one of the first transmission or the second transmission in accordance with a conflict resolution rule based at least in part on the second set of resources at least partially overlapping with the first set of resources.

Aspect 18: The method of aspect 17, the receiving of at least one of the first transmission or the second transmission comprising: obtaining the first transmission and the second transmission on the second set of resources, wherein the second transmission is rate matched according to the first transmission.

Aspect 19: The method of aspect 18, wherein a content of the first transmission is received on a subset of the second set of resources in accordance with the conflict resolution rule.

Aspect 20: The method of aspect 19, wherein a hybrid automatic repeat request field, a scheduling request, a first part of channel state information, a second part of channel state information, or any combination thereof, each correspond to a respective configured portion of the subset of the second set of resources.

Aspect 21: The method of aspect 17, the receiving of at least one of the first transmission or the second transmission comprising: receiving the first transmission and the second transmission frequency division multiplexed or time division multiplexed together on the second set of resources based at least in part on a format of the first transmission.

Aspect 22: The method of aspect 21, wherein the first transmission is frequency division multiplexed with the second transmission based at least in part on the format of the first transmission being a long format.

Aspect 23: The method of any of aspects 21 through 22, wherein the first transmission is time division multiplexed with the second transmission based at least in part on the format of the first transmission being a short format.

Aspect 24: The method of aspect 23, wherein the first transmission at least partially punctures the second transmission on the second set of resources.

Aspect 25: The method of aspect 17, the receiving of at least one of the first transmission or the second transmission comprising: receiving, at least partially concurrently, the first transmission on the first set of resources and the second transmission on the second set of resources.

Aspect 26: The method of aspect 17, the receiving of at least one of the first transmission or the second transmission comprising: determining one or more resource blocks of the second transmission that overlap in time or frequency, or both, with the first transmission have been dropped; receiving the first transmission on the first set of resources; and receiving a remaining portion of the second transmission on a portion of the second set of resources based at least in part on the one or more resource blocks of the second transmission being dropped.

Aspect 27: The method of aspect 17, the receiving of at least one of the first transmission or the second transmission comprising: receiving the second transmission and the first transmission multiplexed together on the first set of resources or the second set of resources based at least in part on the first transmission and the second transmission completely overlapping in time.

Aspect 28: An apparatus for wireless communications at a first wireless device, comprising a processor and memory coupled to the processor; the processor and memory configured to perform a method of any of aspects 1 through 16.

Aspect 29: An apparatus for wireless communications at a first wireless device, comprising at least one means for performing a method of any of aspects 1 through 16.

Aspect 30: A non-transitory computer-readable medium storing code for wireless communications at a first wireless device, the code comprising instructions executable by a processor to perform a method of any of aspects 1 through 16.

Aspect 31: An apparatus for wireless communications at a second wireless device, comprising a processor and memory coupled to the processor; the processor and memory configured to perform a method of any of aspects 17 through 27.

Aspect 32: An apparatus for wireless communications at a second wireless device, comprising at least one means for performing a method of any of aspects 17 through 27.

Aspect 33: A non-transitory computer-readable medium storing code for wireless communications at a second wireless device, the code comprising instructions executable by a processor to perform a method of any of aspects 17 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first wireless device, comprising:
    receiving, from a second wireless device via a sidelink communication link, a first control message that schedules a sidelink control information transmission to be transmitted by the first wireless device to the second wireless device using a first set of resources of a resource pool dedicated for sidelink control information, the resource pool dedicated for sidelink control information being different from a sidelink resource pool that includes physical sidelink control channel (PSCCH) resources and physical sidelink shared channel (PSSCH) resources;
    receiving a second control message comprising an indication that a sidelink transmission is scheduled to be transmitted by the first wireless device using a second set of resources that at least partially overlaps in time with the first set of resources of the resource pool dedicated for sidelink control information; and
    transmitting at least one of the sidelink control information transmission or the sidelink transmission in accordance with a conflict resolution rule based at least in part on the second set of resources at least partially overlapping in time with the first set of resources of the resource pool dedicated for sidelink control information.

2. The method of claim 1, the transmitting of at least one of the sidelink control information transmission or the sidelink transmission comprising:

> transmitting the sidelink control information transmission using the first set of resources; and
> dropping the sidelink transmission in accordance with the conflict resolution rule based at last in part on a higher priority of a content of the sidelink control information transmission.

3. The method of claim 1, the transmitting of at least one of the sidelink control information transmission or the sidelink transmission comprising:

> transmitting the sidelink transmission using the second set of resources; and
> dropping the sidelink control information transmission in accordance with the conflict resolution rule based at last in part on a lower priority of a content of the sidelink control information transmission.

4. The method of claim 1, the transmitting of at least one of the sidelink control information transmission or the sidelink transmission comprising:

> multiplexing the sidelink control information transmission with the sidelink transmission using the second set of resources, wherein the sidelink transmission is rate matched according to the sidelink control information transmission.

5. The method of claim 4, wherein a content of the sidelink control information transmission is transmitted using a subset of the second set of resources in accordance with the conflict resolution rule.

6. The method of claim 5, wherein a hybrid automatic repeat request field, a scheduling request, a first part of channel state information, a second part of channel state information, or any combination thereof, each correspond to a respective configured portion of the subset of the second set of resources.

7. The method of claim 1, the transmitting of at least one of the sidelink control information transmission or the sidelink transmission comprising:

> frequency division multiplexing or time division multiplexing the sidelink control information transmission with the sidelink transmission using the second set of resources based at least in part on a format of the sidelink control information transmission.

8. The method of claim 7, wherein the sidelink control information transmission is frequency division multiplexed with the sidelink transmission based at least in part on the format of the sidelink control information transmission being a long format.

9. The method of claim 7, wherein the sidelink control information transmission is time division multiplexed with the sidelink transmission based at least in part on the format of the sidelink control information transmission being a short format.

10. The method of claim 9, further comprising:

> puncturing at least a portion of the sidelink control information transmission or the sidelink transmission.

11. The method of claim 1, the transmitting of at least one of the sidelink control information transmission or the sidelink transmission comprising:

> transmitting, with at least partial time domain overlap, the sidelink control information transmission using the first set of resources and the sidelink transmission using the second set of resources.

12. The method of claim 1, the transmitting of at least one of the sidelink control information transmission or the sidelink transmission comprising:

> dropping one or more resource blocks of the sidelink control information transmission that overlap in time or frequency, or both, with the sidelink transmission;
> transmitting a remaining portion of the sidelink control information transmission using a portion of the first set of resources; and
> transmitting the sidelink transmission using the second set of resources.

13. The method of claim 1, the transmitting of at least one of the sidelink control information transmission or the sidelink transmission comprising:

> multiplexing the sidelink transmission and the sidelink control information transmission using the first set of resources or the second set of resources based at least in part on the sidelink control information transmission and the sidelink transmission completely overlapping in time.

14. The method of claim 13, wherein the sidelink control information transmission is multiplexed in the sidelink transmission based at least in part on the sidelink control information transmission having a short format and the sidelink transmission having a long format, or the sidelink transmission is multiplexed in the sidelink control information transmission based at least in part on the sidelink control information transmission having the long format and the sidelink transmission having the short format.

15. The method of claim 1, wherein the sidelink control information transmission is a sidelink uplink control information transmission, and the sidelink transmission is a second shared channel transmission.

16. The method of claim 1, wherein the sidelink control information transmission is a first sidelink uplink control information transmission, and the sidelink transmission is a second sidelink uplink control information transmission.

17. A method for wireless communications at a second wireless device, comprising:

> transmitting, to a first wireless device via a sidelink communication link, a first control message that schedules a sidelink control information transmission from the first wireless device to the second wireless device using a first set of resources of a resource pool dedicated for sidelink control information, the resource pool dedicated for sidelink control information being different from a sidelink resource pool that includes physical sidelink control channel (PSCCH) resources and physical sidelink shared channel (PSSCH) resources;
> transmitting a second control message comprising an indication that a sidelink transmission is scheduled to be transmitted by the first wireless device to the second wireless device using a second set of resources that at least partially overlaps in time with the first set of resources of the resource pool dedicated for sidelink control information; and
> receiving at least one of the sidelink control information transmission or the sidelink transmission in accordance with a conflict resolution rule based at least in part on the second set of resources at least partially overlapping in time with the first set of resources of the resource pool dedicated for sidelink control information.

18. The method of claim 17, the receiving of at least one of the sidelink control information transmission or the sidelink transmission comprising:

> obtaining the sidelink control information transmission and the sidelink transmission using the second set of resources, wherein the sidelink transmission is rate matched according to the sidelink control information transmission.

19. The method of claim 18, wherein a content of the sidelink control information transmission is received using a subset of the second set of resources in accordance with the conflict resolution rule.

20. The method of claim 19, wherein a hybrid automatic repeat request field, a scheduling request, a first part of channel state information, a second part of channel state information, or any combination thereof, each correspond to a respective configured portion of the subset of the second set of resources.

21. The method of claim 17, the receiving of at least one of the sidelink control information transmission or the sidelink transmission comprising:
receiving the sidelink control information transmission and the sidelink transmission frequency division multiplexed or time division multiplexed together on the second set of resources based at least in part on a format of the sidelink control information transmission.

22. The method of claim 21, wherein the sidelink control information transmission is frequency division multiplexed with the sidelink transmission based at least in part on the format of the sidelink control information transmission being a long format.

23. The method of claim 21, wherein the sidelink control information transmission is time division multiplexed with the sidelink transmission based at least in part on the format of the sidelink control information transmission being a short format.

24. The method of claim 23, wherein the sidelink control information transmission at least partially punctures the sidelink transmission using the second set of resources.

25. The method of claim 17, the receiving of at least one of the sidelink control information transmission or the sidelink transmission comprising:
receiving, at least partially concurrently, the sidelink control information transmission using the first set of resources and the sidelink transmission using the second set of resources.

26. The method of claim 17, the receiving of at least one of the sidelink control information transmission or the sidelink transmission comprising:
determining one or more resource blocks of the sidelink transmission that overlap in time or frequency, or both, with the sidelink control information transmission have been dropped;
receiving the sidelink control information transmission using the first set of resources; and
receiving a remaining portion of the sidelink transmission using a portion of the second set of resources based at least in part on the one or more resource blocks of the sidelink transmission being dropped.

27. The method of claim 17, the receiving of at least one of the sidelink control information transmission or the sidelink transmission comprising:
receiving the sidelink transmission and the sidelink control information transmission multiplexed together on the first set of resources or the second set of resources based at least in part on the sidelink control information transmission and the sidelink transmission completely overlapping in time.

28. An apparatus for wireless communications at a first wireless device, comprising:
one or more memories; and
one or more processors coupled with the one or more memories and individually or collectively configured to cause the first wireless device to:
receive, from a second wireless device via a sidelink communication link, a first control message that schedules a sidelink control information transmission to be transmitted by the first wireless device to the second wireless device using a first set of resources of a resource pool dedicated for sidelink control information, the resource pool dedicated for sidelink control information being different from a sidelink resource pool that includes physical sidelink control channel (PSCCH) resources and physical sidelink shared channel (PSSCH) resources;
receive a second control message comprising an indication that a sidelink transmission is scheduled to be transmitted by the first wireless device using a second set of resources that at least partially overlaps in time with the first set of resources of the resource pool dedicated for sidelink control information; and
transmit at least one of the sidelink control information transmission or the sidelink transmission in accordance with a conflict resolution rule based at least in part on the second set of resources at least partially overlapping in time with the first set of resources of the resource pool dedicated for sidelink control information.

29. The apparatus of claim 28, the apparatus further comprising:
one or more antennas, wherein, to transmit the at least one of the sidelink control information transmission or the sidelink transmission, the one or more processors are individually or collectively further configured to cause the first wireless device to:
drop one or more resource blocks of the sidelink control information transmission that overlap in time or frequency, or both, with the sidelink transmission;
transmit, via the antenna, a remaining portion of the sidelink control information transmission using a portion of the first set of resources; and
transmit, via the antenna, the sidelink transmission using the second set of resources.

30. The apparatus of claim 28, wherein, to transmit at least one of the sidelink control information transmission or the sidelink transmission, the one or more processors are individually or collectively configured to cause the second wireless device to:
transmit the sidelink control information transmission using the first set of resources; and
drop the sidelink transmission in accordance with the conflict resolution rule based at last in part on a higher priority of a content of the sidelink control information transmission.

31. The apparatus of claim 28, wherein, to transmit at least one of the sidelink control information transmission or the sidelink transmission, the one or more processors are individually or collectively configured to cause the second wireless device to:
transmit the sidelink transmission using the second set of resources; and
drop the sidelink control information transmission in accordance with the conflict resolution rule based at last in part on a lower priority of a content of the sidelink control information transmission.

32. The apparatus of claim 28, wherein, to transmit at least one of the sidelink control information transmission or the sidelink transmission, the one or more processors are individually or collectively configured to cause the second wireless device to:
  multiplex the sidelink control information transmission with the second sidelink transmission using the second set of resources, wherein the sidelink transmission is rate matched according to the sidelink control information transmission.

33. An apparatus for wireless communications at a second wireless device, comprising:
  one or more memories; and
  one or more processors coupled with the one or more memories and individually or collectively configured to cause the second wireless device to:
    transmit, to a first wireless device via a sidelink communication link, a first control message that schedules a sidelink control information transmission from the first wireless device to the second wireless device using a first set of resources of a resource pool dedicated for sidelink control information, the resource pool dedicated for sidelink control information being different from a sidelink resource pool that includes physical sidelink control channel (PSCCH) resources and physical sidelink shared channel (PSSCH) resources;
    transmit a second control message comprising an indication that a sidelink transmission is scheduled to be transmitted by the first wireless device to the second wireless device using a second set of resources that at least partially overlaps in time with the first set of resources of the resource pool dedicated for sidelink control information; and
    receive at least one of the sidelink control information transmission or the sidelink transmission in accordance with a conflict resolution rule based at least in part on the second set of resources at least partially overlapping in time with the first set of resources of the resource pool dedicated for sidelink control information.

34. The apparatus of claim 33, wherein, to receive at least one of the sidelink control information transmission or the sidelink transmission, the one or more processors are individually or collectively configured to cause the second wireless device to:
  obtain the sidelink control information transmission and the sidelink transmission using the second set of resources, wherein the sidelink transmission is rate matched according to the sidelink control information transmission.

35. The apparatus of claim 34, wherein a content of the sidelink control information transmission is received using a subset of the second set of resources in accordance with the conflict resolution rule.

36. The apparatus of claim 35, wherein a hybrid automatic repeat request field, a scheduling request, a first part of channel state information, a second part of channel state information, or any combination thereof, each correspond to a respective configured portion of the subset of the second set of resources.

37. The apparatus of claim 33 wherein, to receive at least one of the sidelink control information transmission or the sidelink transmission, the one or more processors are individually or collectively configured to cause the second wireless device to:
  receive the sidelink control information transmission and the sidelink transmission frequency division multiplexed or time division multiplexed together on the second set of resources based at least in part on a format of the sidelink control information transmission.

38. A non-transitory computer-readable medium storing code for wireless communications at a first wireless device, the code comprising instructions executable by one or more processors to cause the first wireless device to:
  receive, from a second wireless device via a sidelink communication link, a first control message that schedules a sidelink control information transmission to be transmitted by the first wireless device to the second wireless device using a first set of resources of a resource pool dedicated for sidelink control information, the resource pool dedicated for sidelink control information being different from a sidelink resource pool that includes physical sidelink control channel (PSCCH) resources and physical sidelink shared channel (PSSCH) resources;
  receive a second control message comprising an indication that a sidelink transmission is scheduled to be transmitted by the first wireless device using a second set of resources that at least partially overlaps in time with the first set of resources of the resource pool dedicated for sidelink control information; and
  transmit at least one of the sidelink control information transmission or the sidelink transmission in accordance with a conflict resolution rule based at least in part on the second set of resources at least partially overlapping in time with the first set of resources of the resource pool dedicated for sidelink control information.

39. The non-transitory computer-readable medium of claim 38, wherein the instructions to transmit at least one of the sidelink control information transmission or the sidelink transmission are executable by the one or more processors to cause the first wireless device to:
  transmit the sidelink control information transmission using the first set of resources; and
  drop the sidelink transmission in accordance with the conflict resolution rule based at last in part on a higher priority of a content of the sidelink control information transmission.

40. The non-transitory computer-readable medium of claim 38, wherein the instructions to transmit at least one of the sidelink control information transmission or the sidelink transmission are executable by the one or more processors to cause the first wireless device to:
  transmit the sidelink transmission using the second set of resources; and
  drop the sidelink control information transmission in accordance with the conflict resolution rule based at last in part on a lower priority of a content of the sidelink control information transmission.

41. The non-transitory computer-readable medium of claim 38, wherein the instructions to transmit at least one of the sidelink control information transmission or the sidelink transmission are executable by the one or more processors to cause the first wireless device to:
  multiplex the sidelink control information transmission with the sidelink transmission using the second set of resources, wherein the sidelink transmission is rate matched according to the sidelink control information transmission.

42. A non-transitory computer-readable medium storing code for wireless communications at a second wireless device, the code comprising instructions executable by one or more processors to cause the second wireless device to:
  transmit, to a first wireless device via a sidelink communication link, a first control message that schedules a sidelink control information transmission from the first wireless device to the second wireless device using a first set of resources of a resource pool dedicated for sidelink control information, the resource pool dedicated for sidelink control information being different from a sidelink resource pool that includes physical sidelink control channel (PSCCH) resources and physical sidelink shared channel (PSSCH) resources;

transmit a second control message comprising an indication that a sidelink transmission is scheduled to be transmitted by the first wireless device to the second wireless device using a second set of resources that at least partially overlaps in time with the first set of resources of the resource pool dedicated for sidelink control information; and receive at least one of the sidelink control information transmission or the sidelink transmission in accordance with a conflict resolution rule based at least in part on the second set of resources at least partially overlapping in time with the first set of resources of the resource pool dedicated for sidelink control information.

43. The non-transitory computer-readable medium of claim 42, wherein the instructions to receive at least one of the sidelink control information transmission or the sidelink transmission are executable by the one or more processors to cause the second wireless device to:

obtain the sidelink control information transmission and the sidelink transmission using the second set of resources, wherein the sidelink transmission is rate matched according to the sidelink control information transmission.

44. The non-transitory computer-readable medium of claim 43, wherein a content of the sidelink control information transmission is received using a subset of the second set of resources in accordance with the conflict resolution rule.

45. The non-transitory computer-readable medium of claim 44, wherein a hybrid automatic repeat request field, a scheduling request, a first part of channel state information, a second part of channel state information, or any combination thereof, each correspond to a respective configured portion of the subset of the second set of resources.

46. The non-transitory computer-readable medium of claim 42 wherein the instructions to receive at least one of the sidelink control information transmission or the sidelink transmission are executable by the one or more processors to cause the second wireless device to:

receive the sidelink control information transmission and the sidelink transmission frequency division multiplexed or time division multiplexed together on the second set of resources based at least in part on a format of the sidelink control information transmission.

\* \* \* \* \*